(12) United States Patent
Muhanna et al.

(10) Patent No.: US 7,209,540 B2
(45) Date of Patent: Apr. 24, 2007

(54) VESSEL SCANNING SYSTEM

(75) Inventors: Abdulaziz Al Muhanna, Riyadh (SA); Khalid Abaal Khail, Riyadh (SA); Aijaz Anwar, Stockport (GB); Nagib El Alam, Riyadh (SA)

(73) Assignee: EG&G Middle East (SA)

( * ) Notice: Subject to any disclaimer, the term of this patent is extended or adjusted under 35 U.S.C. 154(b) by 90 days.

(21) Appl. No.: 11/021,512

(22) Filed: Dec. 22, 2004

(65) Prior Publication Data

US 2006/0269042 A1    Nov. 30, 2006

(51) Int. Cl.
    *G01N 23/04* (2006.01)
(52) U.S. Cl. ..................................... 378/57
(58) Field of Classification Search .............. 378/57, 378/68, 69, 208; 250/358.1, 359.1, 360.1
    See application file for complete search history.

(56) References Cited

U.S. PATENT DOCUMENTS

| | | | | |
|---|---|---|---|---|
| 3,980,889 | A | 9/1976 | Haas et al. | 378/57 |
| 4,020,346 | A | 4/1977 | Dennis | 378/57 |
| 4,239,969 | A | 12/1980 | Haas et al. | 378/57 |
| 4,379,481 | A | 4/1983 | Juner et al. | 160/310 |
| 5,012,917 | A | 5/1991 | Gilbert et al. | 198/465.2 |
| 5,195,629 | A | 3/1993 | Gottstein et al. | 198/465.2 |
| 5,388,684 | A | 2/1995 | Peck | 198/465.1 |
| 5,754,617 | A | 5/1998 | Itoh | 378/4 |
| 5,838,759 | A | 11/1998 | Armistead | 378/57 |
| 5,930,326 | A * | 7/1999 | Rothschild et al. | 378/57 |
| 6,658,087 | B2 * | 12/2003 | Chalmers et al. | 378/86 |

* cited by examiner

*Primary Examiner*—Courtney Thomas
(74) *Attorney, Agent, or Firm*—Akin Gump Strauss Hauer & Feld, LLP

(57) ABSTRACT

An inspection system allows scanning an entire vessel and its contents in a water-filled passage. A radiation source emits a beam of radiation across a radiation path between the radiation source and a radiation detector. An imaging subsystem creates an image of the entire vessel and its contents from the radiation detector, displaying the image for an inspector. If suspect areas are detected, the inspector can flag the vessel for manual inspection. A water exclusion system excludes most of the water from the radiation path, allowing imaging of underwater portions of the vessel in addition to above-water portions of the vessel. A transport system moves the vessel through the passage at a predetermined distance from one side of the passage. Rollers prevent damage to the vessel and the side of the passage in transit, while also positioning the vessel at the predetermined distance from the side of the passage.

136 Claims, 23 Drawing Sheets

VESSEL SCANNING SYSTEM

CROSS-REFERENCE TO RELATED APPLICATIONS

N/A

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The present invention relates to the field of inspection systems and, in particular, to a system for scanning boats and other small sea-going vessels.

2. Description of the Related Art

All countries desire to control who or what items cross their borders. Governments consider border control necessary for economic, political, and security reasons. Economic reasons may include payment of customs duties and other tariffs. Political concerns may include immigration and other national policy issues. Security concerns may include drugs and weapons trafficking. However, smugglers have presented problems for border control for centuries.

International trade plays a major role in the national economy of almost every country in the world. The magnitude and growth of the import and export trade is a good measure of the strength of an economy. International trade facilitates countries to achieve optimum levels of economic growth by allowing export of surplus domestic production while providing the means to import goods, which is often considered essential to achieving a high level of living standard for the population.

Maintaining an effective control over the goods entering through the various ports of entry has long been a major challenge for the customs officials. The presence of such a control not only allows correct collection of customs duties and other governmental revenues, but also limits smuggling of contraband items such as arms, explosives and drugs. Moreover, large volumes of imported goods generally make it impossible for customs officials to maintain a program of full inspection with 100% coverage by using the traditional methods of physical inspection.

Customs agencies have installed stringent controls backed by sophisticated inspection devices at airports and land border crossings. However, smuggling by sea remains a significant problem for customs agencies.

Customs agencies have recognized this need and have endeavored to equip themselves with inspection technologies that provide high degree of automation in the customs inspection process. Among such technologies are cargo X-ray systems, which would provide a fast, efficient, safe and cost-effective method of inspecting large volumes of containerized cargo. However, these systems have heretofore been unavailable for inspecting sailing vessels.

Cargo X-ray systems are an invaluable tool to uncover banned goods and items such as weapons, ammunition, explosives, drugs and many others. By utilizing state of the art imaging and image processing technologies, customs inspectors can easily identify smuggled goods even if hidden in dense cargo or concealed compartments.

In many areas of the world, a substantial proportion of trade uses small boats (known in some areas as "dhows") for cargo transport. These vessels have traditionally been used to transport all types of goods including grain, spices, fruits, vegetables, handcrafts, and other merchandise.

The vast majority of these vessels are owned and operated by individuals who sometimes fall into the alluring trap of making quick financial gains by smuggling contraband. Such contraband may take different forms including manifest fraud, drugs, illegal immigrants and sometimes weapons or explosives.

Shipwrights typically build dhows to order, with no standard design. Such custom designs give rise to the opportunity for creating hidden or concealed compartments in the design, particularly in hard to reach areas. Although these compartments may have legitimate uses, smugglers may also use these compartments for smuggling contraband. Experienced customs inspectors may know the likely places for hiding contraband, but due to the large variation in design, customs inspectors may not locate all the hidden compartments and thus cannot guarantee 100% inspection. In addition, inspectors may have to offload the cargo to carry out inspection of the cargo. This is time consuming and has the potential of damaging the cargo.

Despite such problems with manual inspection of vessels, to Applicant's best knowledge, a sailing vessel scanning system has never been designed and put into commercial use anywhere in the world

BRIEF SUMMARY OF THE INVENTION

In brief, a system for scanning a vessel, comprises a passage filled with water for transporting the vessel having a first side, a second side, a first end, and a second end, and a scanning system, adapted to scan the entire vessel and its contents. A vessel transport system moves the vessel through the passage to be scanned. In one embodiment, the vessel transport system uses winches to pull the vessel through the passage. The scanning system can comprise a radiation emitter and a radiation detector, forming a radiation path across the passage through which the vessel passes for scanning. A water exclusion system, such as a balloon or a plurality of air-filled or other low-density exclusion members, excludes water along the radiation path, allowing the radiation beam to scan the entire vessel, including submerged portions of the vessel. A radiation shield can provide shielding to system personnel and vessel crew during scanning of the vessel. The radiation emitter can use various techniques for expanding the beam fan angle of the radiation source.

BRIEF DESCRIPTION OF THE SEVERAL VIEWS OF THE DRAWINGS

A better understanding of the present invention can be obtained when the following detailed description of various disclosed embodiments is considered in conjunction with the following drawings, in which.

DETAILED DESCRIPTION OF THE INVENTION

Figure 1A:
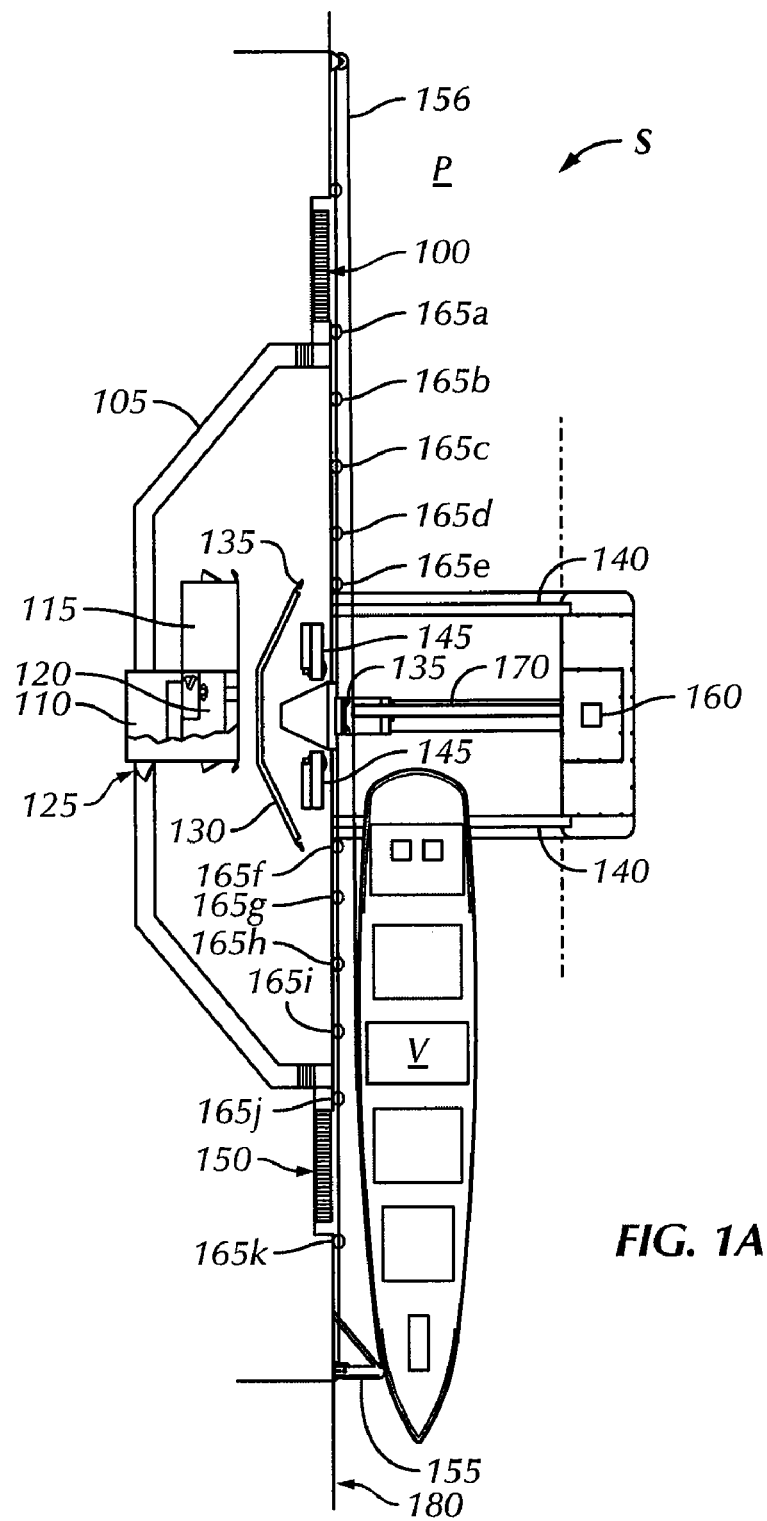
FIG. 1a is a top view illustrating a vessel scanning system S according to one embodiment.

As used herein, the terms "vessel," "dhow," "ship," and "boat" all interchangeably refer to vessels of all types, without distinction, unless expressly stated otherwise. Although as described below such vessels are typically water-borne, the disclosed system and techniques expressly envision inspections of vessels in fluids of all types, including water. Thus, references herein to "water" include all fluids of every type. Embodiments of the disclosed system and technique can inspect cargo-containing vessels for contraband contained in the cargo; however, the disclosure expressly envisions inspection of the vessel itself for all purposes, including structural and testing purposes, in addition to inspection of the contents for contraband. Although the following is presented in terms of an X-ray inspection system, all references to X-rays should be understood as exemplary and illustrative only, and other types of radiation beams can be used for scanning. An example of an alternate type of radiation beam is a gamma ray beam.

Currently, customs inspectors of the relevant countries carry out the inspection of small cargo boats. The following discloses use of a high-energy radiation source, such as an X-ray source, for inspection of water-borne vessels and their contents without removing the vessel from the water. The radiation source, typically a 9 meV X-ray emitter, produces a narrow beam fan of radiation that passes through the vessel and its cargo. A detector array composed of photoelectric diodes coupled to scintillators senses the radiation once it has passed through the vessel and its cargo. An imaging system allows an inspector to view the vessel and its cargo, without removing the vessel from the water.

Water acts as a radiation shield, adsorbing the radiation energy. Therefore, inspectors have not previously inspected water-borne vessels using scanning techniques, because the scanning would result in no or very poor quality images.

As disclosed herein, low-density polymeric materials or air balloons placed in the X-ray path from the X-ray source to a detector array displace or remove some or all of the water in the X-ray path.

Scanning vessels has previously presented several challenges that prevented development of a vessel scanning system.

To Applicants' best knowledge, there has been no known attempt to X-ray scan objects that are surrounded by both air and water at the same time. Although X-rays travel through air with acceptable losses in intensity, X-rays quickly attenuate when traveling through water. The water's density compared to steel is approximately 1:7.8, which means that X-rays capable of penetrating 100 mm of steel would completely attenuate when traveling through 780 mm of water. X-rays emitted by the highest commercially available 9 MeV source, which is capable of penetrating approximately 360 mm of steel, would only travel through less than 3.0 m of water before complete attenuation.

Vessels can be quite large in size reaching 7 m by 7 m by 30 m (width, height, length) and in some cases more. There are no known existing X-ray systems in the world with a scan envelope that covers such sizes. Moreover, the large variations in vessel sizes impose physical constraints, but then the requirement is for a system that would be capable of scanning vessels with different sizes.

Attaining the best geometry of the scan beam in relation to the X-ray source and the detector array is challenging, because it would be impractical to house the X-ray source under water, which limits its position to above water level. If the X-ray generator is positioned above water, the detector array needs to be placed in opposite perpendicular angle, which means that a portion of or the entire detector array needs to be submersed under water. Moreover, the vessels tend to have very tall upstanding masts, which in turn necessitate an open ceiling scan tunnel.

Existing 9 MeV sources typically generate triangular X-ray beams at 24° at max. For a scan beam to cover a vessel with the aforementioned profile, the X-ray source needs to be placed approximately 30 meters away from the detectors.

The load of a vessel affects the depth of its submersed portion, and the tide affects the water level. A sea sailing vessel X-ray scanning system should be able to account for all the permutations resulting from the size of the vessel, its load, and the tide level.

Many vessels are built primarily of wood by craftsmen using different construction structures and methods. Moreover, since vessels also carry different goods stowed in different ways, almost no two vessels would look similar from the inside or the outside.

Other challenges also included the need for an appropriate motion system to transport vessels through the X-ray scanning beam, radiation shielding and exclusion, adequate scanning capacity and efficiency as well as the environmental constraints and impediments.

As stated above, vessels such as dhows come in a variety of shapes and sizes, depending on the manufacturer, although the majority of dhows do not exceed 7 m by 7 m by 25 m (Height, Width, Length). However, there are larger size vessels that sail into ports in very small numbers not exceeding 5% of the overall number of vessels.

Manufacture of the vessels is carried out by skilled craftsmen using traditional skills passed down through generations and as such, vessel shapes and construction methods vary from one manufacturer to another. As a result, the cargo storage configuration can vary significantly between different vessels.

Generally, vessels are constructed mainly using one of three materials: wood, fiberglass, or steel and other materials.

Wood is the traditional preferred construction material, because wood is light and relatively inexpensive. In some areas, this form of construction accounts for approximately 95% of the small vessels used for transport. The thickness of wood slabs used in vessel construction typically ranges between 25 to 60 mm. Fiberglass is increasingly being used but typically still only accounts for approximately 3% of the vessels in some areas. Steel and other materials are typically used for the remaining 2% of the vessels, which are generally large or have some special applications.

The physical shape of a dhow and other vessels makes carrying out a thorough search of the vessel difficult. The addition of small chambers that can be used for storage of tools and equipment further complicates this difficulty because such chambers can be used for hiding contraband. These chambers are not always easy to spot, particularly with a fully laden vessel. Additionally, with the non-uniformity in vessel design, the permutations of where enclosed chambers are located become fairly high.

Although trained and experienced customs staff can use their experience as well as some intelligence gathering exercises to spot and locate the vast majority of contraband in vessels, customs agencies know that inspection cannot be 100% for every vessel arriving for inspection.

This poses a potential security risk that must be minimized by using the latest technology to ensure all vessels are properly searched and screened in order to maintain a high confidence level that those vessels do not represent any threat to the society as well as the national security.

In busy ports, 100 or more cargo-laden vessels may enter the port daily. Generally, the majority of vessels arrive during daylight hours and only a small percentage may arrive at night.

In summary, a vessel X-ray screening system according to various disclosed embodiments would include some or all of the following features:

The system can scan vessels of different sizes from 1.0 m by 1.0 m high by 2 m up to 7 m by 7 m by 25 m (Weight, Height, Length). These dimensions are exemplary and illustrative only, and other minimum and maximum dimensions can be used.

The system employs a full 9 MeV intensity that is capable of penetrating equivalents of 360 mm of steel to scan the above water portions of vessels. The submersed portions however, are penetrated by lower effective intensity X-rays (partially weakened by water and the water displacement mechanism) which approximately penetrate at minimum the equivalent of 220 mm of steel.

One prominent advantage of using a 9 MeV X-ray source is superior image resolution and quality. Those can be enhanced by the powerful handling and processing capabilities of the image analysis workstation software that can be supplied along with some other custom-developed filters.

The system is capable of scanning up to 10 full size vessels every hour, depending on the efficiency of the system's operators and the vessel captains. Moreover, the system is not only be very efficient but would also very simple to operate and maintain, which can extend its lifetime.

The system can occupy a relatively economical footprint, in some embodiments, not exceeding 25 m by 60 m (WL). Moreover, the system's exterior design and finishing can look attractive enough to make it a landmark.

Such fixed, high-energy X-ray scanning system can achieve-the penetration and efficiency required to inspect vessels even if loaded with dense cargo. Such performance can result in the satisfactory imaging of virtually any type of contraband likely to be encountered in practice. Various image-processing functions, which are quick and easy to use, make the examination completely effective. With a minimum amount of training, the systems can be operated flawlessly by customs officers.

Figure 1B:
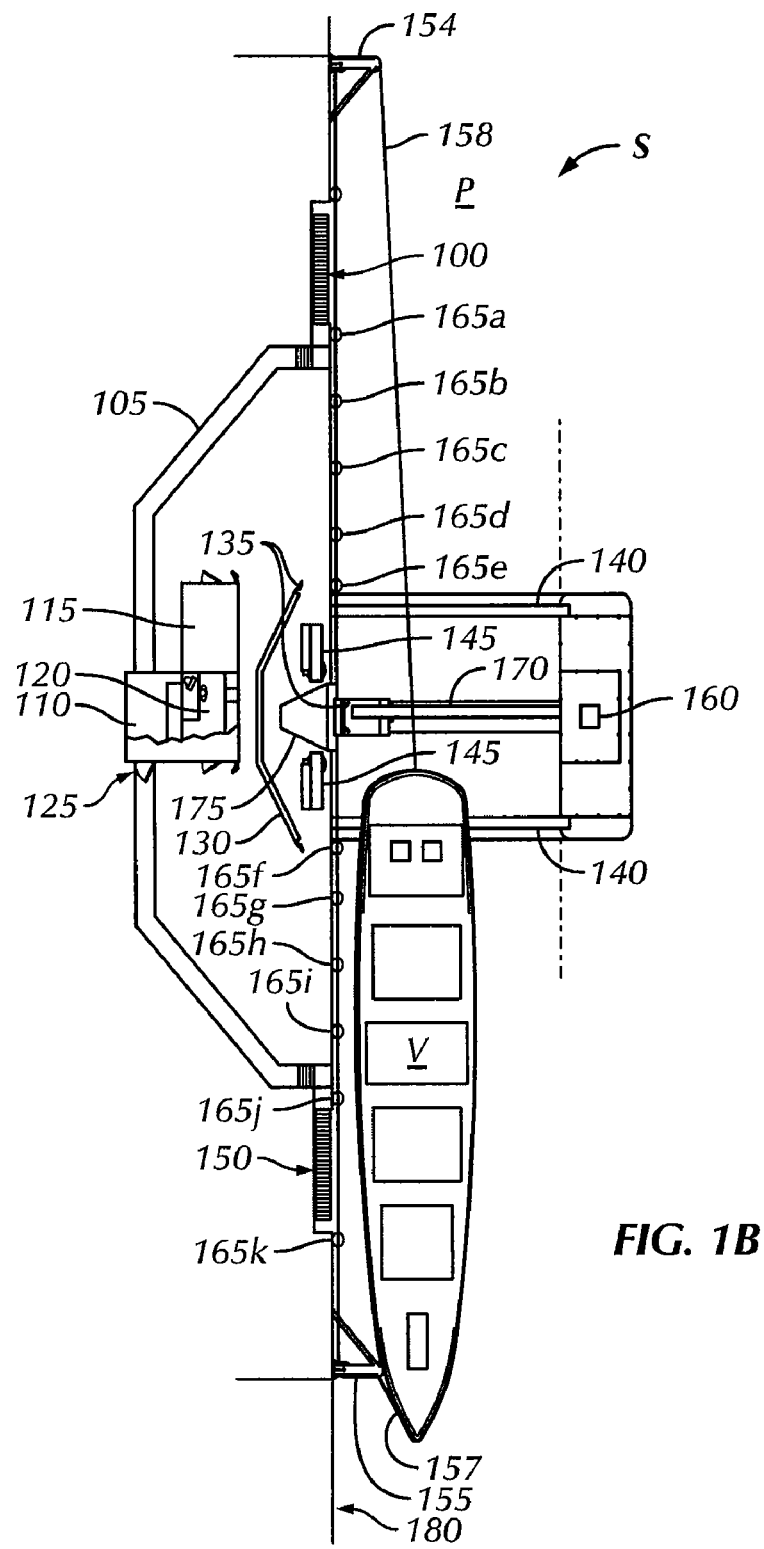
FIG. 1b is a top view illustrating the vessel scanning system S of FIG. 1a with an alternate motion system configuration.

The system's mode of operation can consist of the following simple sequence of events, generally described according to the elements shown in FIGS. 1a and 1b, which are identical except for the winches and cables used to move a vessel V through the passage P.

Figure 12:
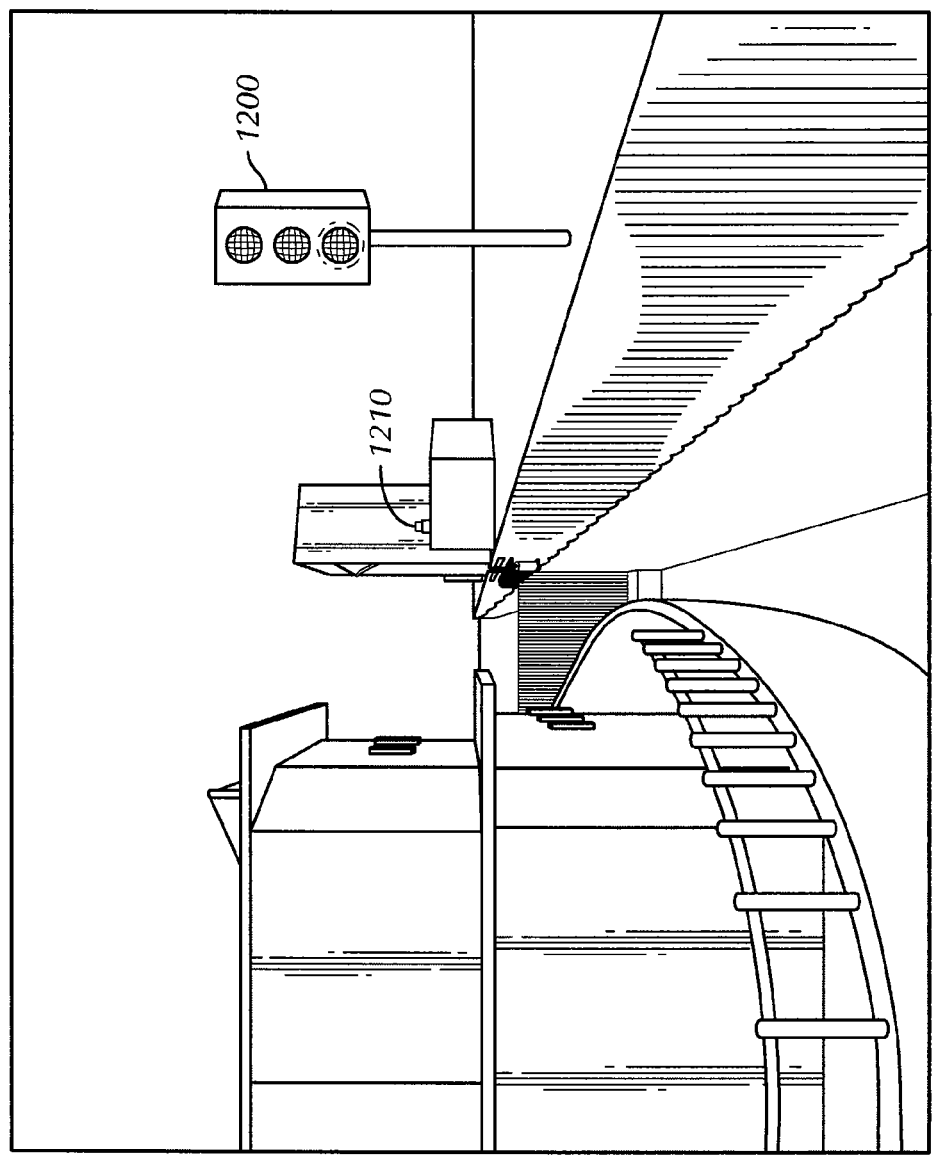
FIG. 12 is an end perspective view of the system S, illustrating a signaling system at entry to the system S.

The vessel V approaching an entrance to the facility of the system S observes a traffic light signal, such as the red/green signal light 1200 of FIG. 12, that is positioned at appropriate distance before the vessel X-ray screening system. The signal light 1200 informs the vessel's captain that the vessel is approaching the screening system area and, when red, to wait before proceeding into the area. When the signal light 1200 turns green, the crew of the vessel V can pilot the vessel V to approach and dock at the disembarkation station 100 shown in FIGS. 1a–1b. The traffic light 1200 then turns red, signaling to the following vessels that the system is busy. The use of red/green signal lights is exemplary and illustrative, and other forms of signaling can be used, including other colors of signal lights, semaphores, textual signs and message boards, and other types of indicators, in addition to movable barriers.

Figure 16A:
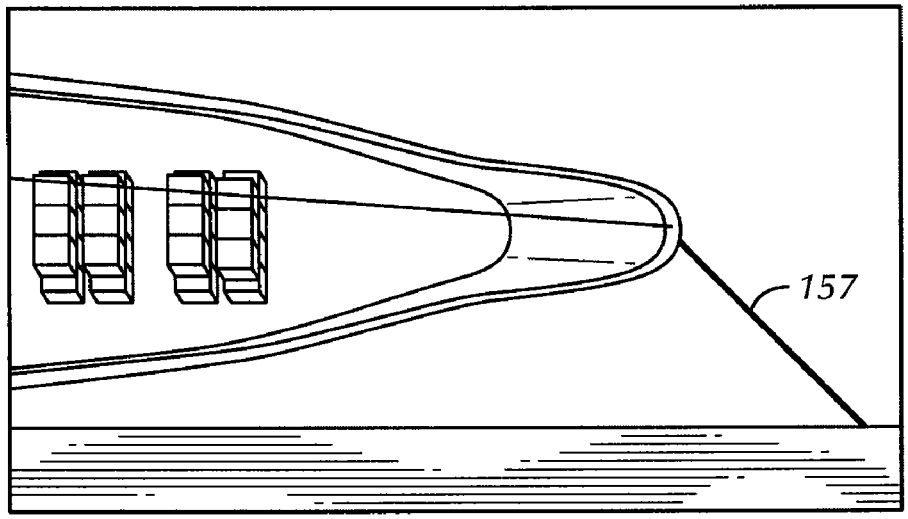
FIGS. 16a–16b are top views illustrating a vessel transport system for the system S.
Figure 16B:
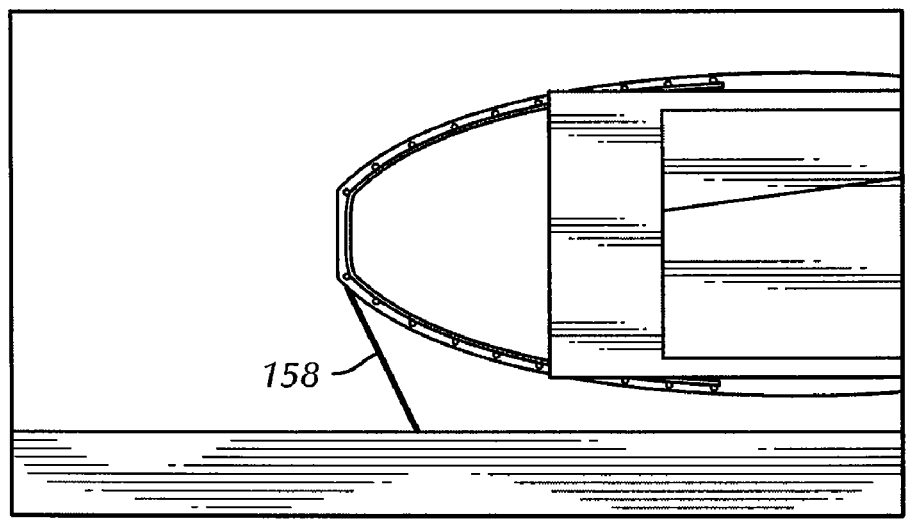

The system's traffic marshal throws the motion system's winch cables to the vessel V's crew to attach them to its mooring points at the front (fore) and the rear (aft) of the vessel V, as best shown in FIGS. 16a and 16b.

Figure 17:
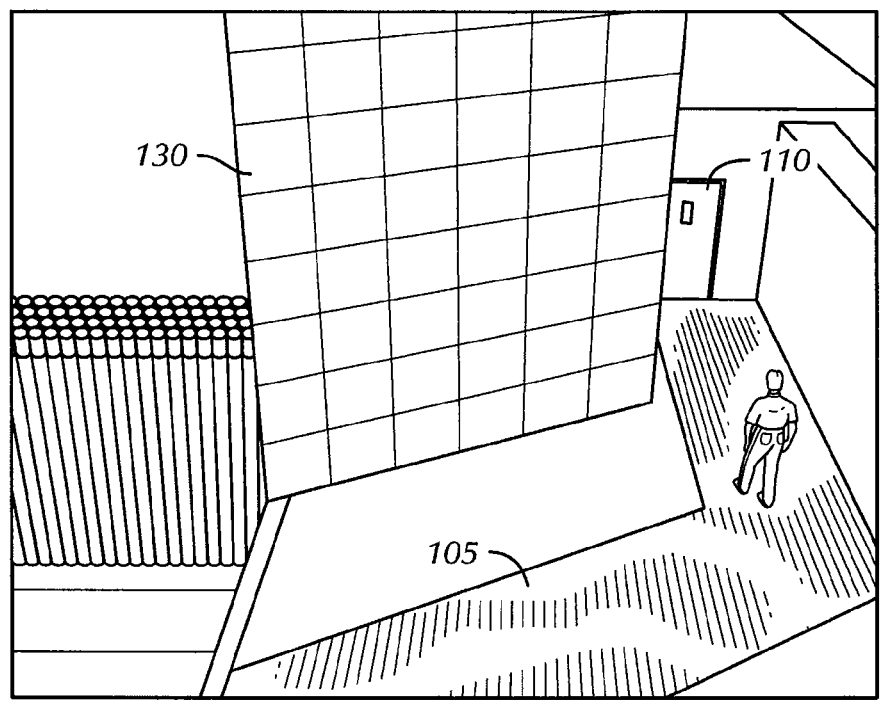
FIG. 17 is a perspective view illustrating a vessel crew entering a crew waiting area for the system S.

The vessel V's crew disembarks and follows a path 105 into a waiting or crew safety room 110 as shown in FIG. 17. The traffic marshal also ensures that the vessel V and the system's surroundings are clear of all personnel.

The system's operator, in the control room 120 also checks one or more closed circuit television (CCTV) cameras for the presence of personnel, then initiates a scan sequence. Audible and visible alarms, such as visible alarm 1210 shown in FIG. 12 and visible alarm 1300 shown in FIG. 13, then sound for a short duration to give any undetected person the chance to become visible or reach an emergency stop switch (not shown).

A vessel advance sequence is initiated by the marshal from within the control room 120. The vessel V is pulled forward at a constant predetermined speed by an external winch system fixed to the dockside, shown in FIG. 1a with a single winch 155 and cable 156 and in FIG. 1b with two synchronized winches 154–155 and cables 157–158. This winching action also moves the vessel V against the rollers 165a–165k fixed to the dockside 180 thus maintaining the vessel V a constant predetermined distance from the dockside 180.

Figure 15:
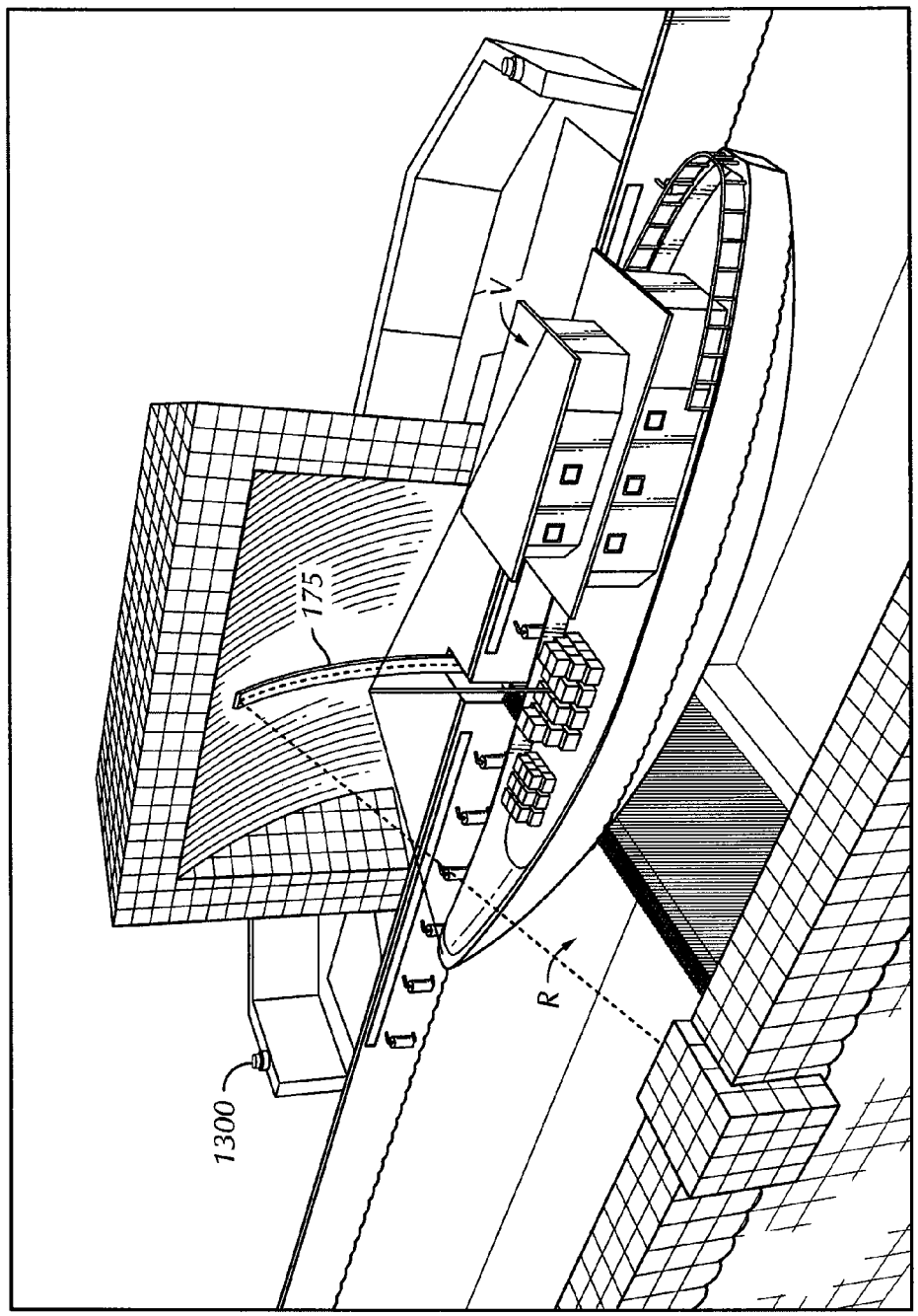
FIG. 15 is a perspective view illustrating a vessel being screened by the system S.

The vessel V is pulled forward at constant predetermined speed by the front winch 155 of the motion system while also being aligned to the pier side by the cable 156 or 158 attached to the rear of the vessel V. As the vessel V approaches the detector array 176 attached to the collimator 175, the vessel V's position can be detected by sensors (not shown) allowing the X-ray source to automatically be switched on; alternatively, the operator can switch on the X-ray system as the vessel V approaches the detector array 176. The vessel V continues to pass through the X-ray beam R being pulled by the motion system, as best shown in FIG. 15.

Figure 18:
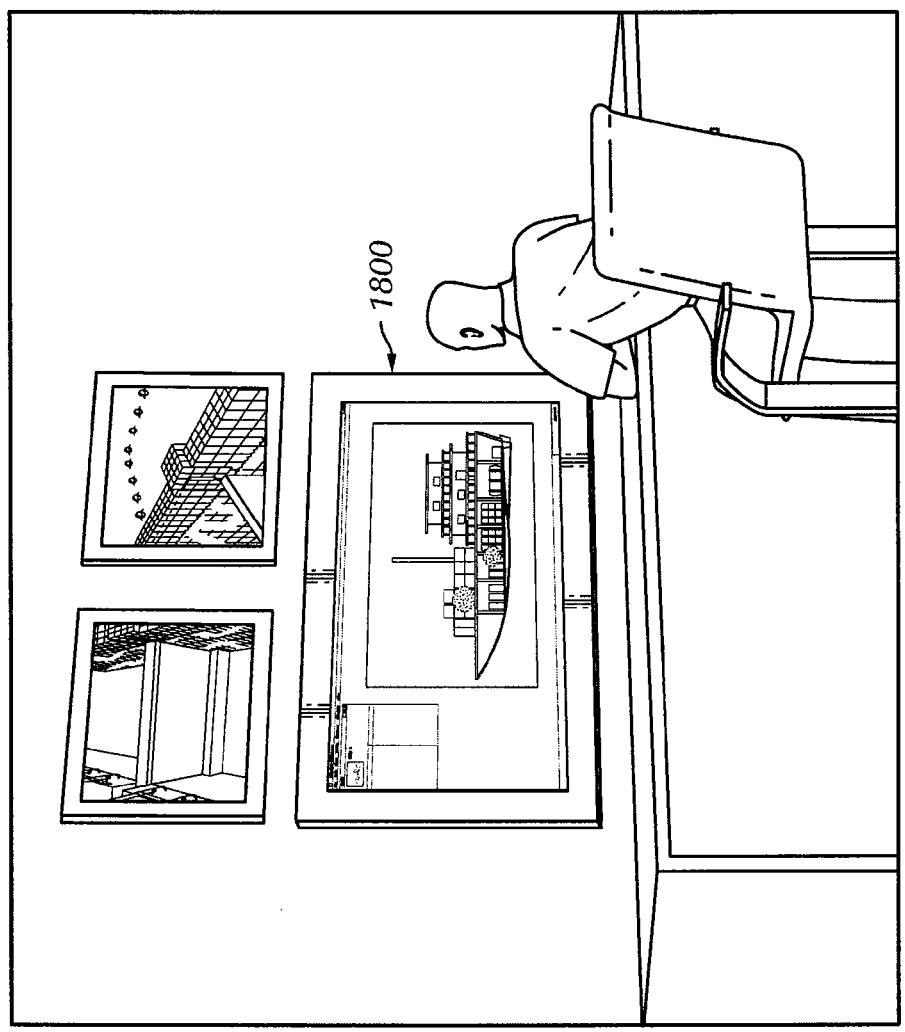
FIG. 18 is a perspective view illustrating an operator station for the system S.
Figure 20:
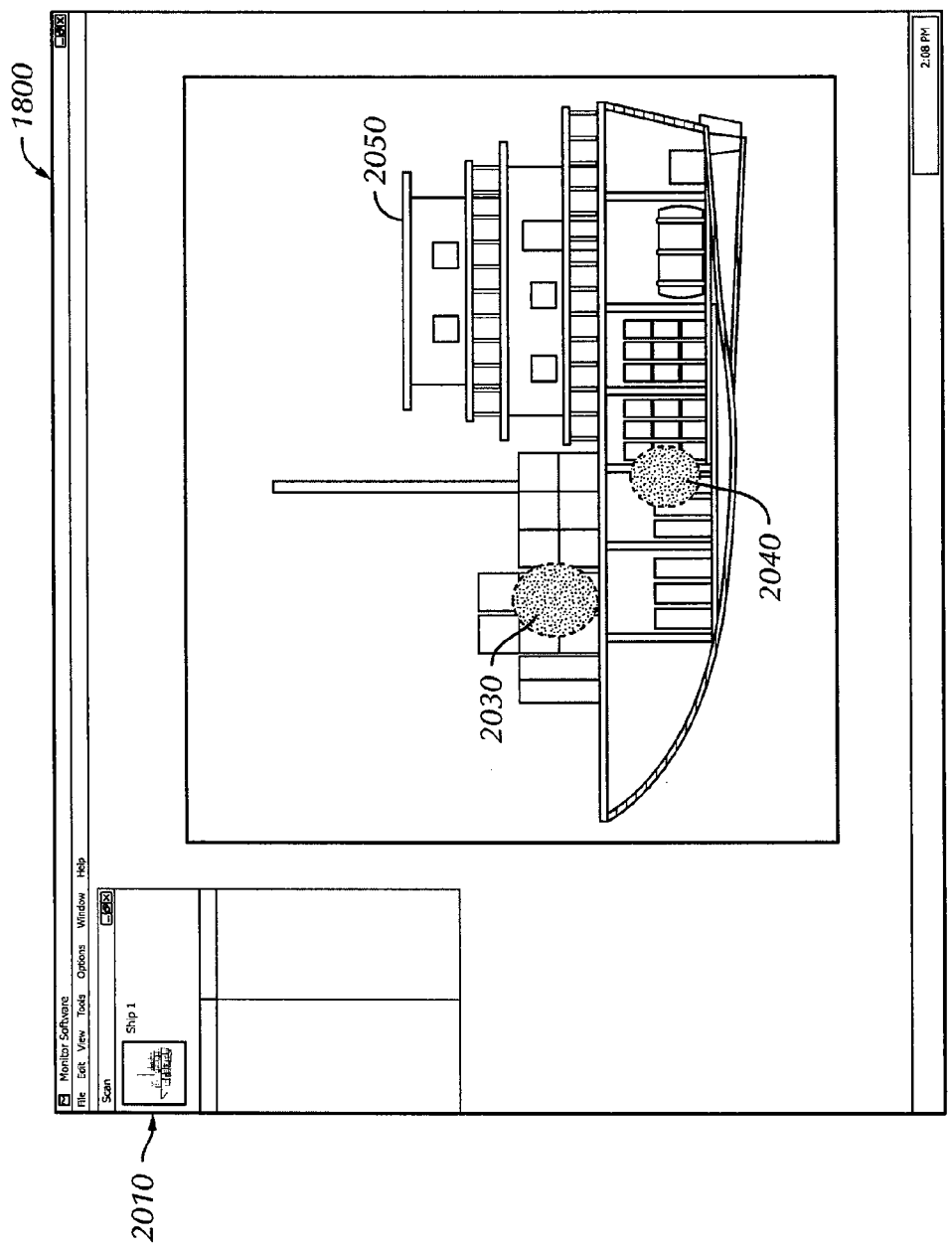
FIG. 20 is a view illustrating a display for the operator station of FIG. 18.

On completion of X-ray scanning the whole vessel V, the X-ray source is automatically or manually switched off and the motion system decelerates to bring the vessel V to dock on the re-embarkation station 150. The full X-ray image of the vessel V is now displayed at the analyst workstation for inspection as best shown in FIGS. 18 and 20. The analyst can then use the display to detect contraband, prohibited goods, and hidden compartments in the vessel, regardless of the density of the vessel V's cargo or how skillfully the contraband is concealed.

While the X-ray image is being analyzed, the vessel V's crew is allowed to leave the waiting room 110 and re-embark their vessel V. Alternatively, the vessel V's crew can be held in the waiting room 110 until analysis is complete. At the same time, the traffic light 1200 before the system S turns green to signal the next vessel to come in to dock on the disembarkation station 100.

The winch cables 156 or 157–158 are unhooked and returned to the disembarkation station 100 ready to be attached to the next vessel.

Figure 22:
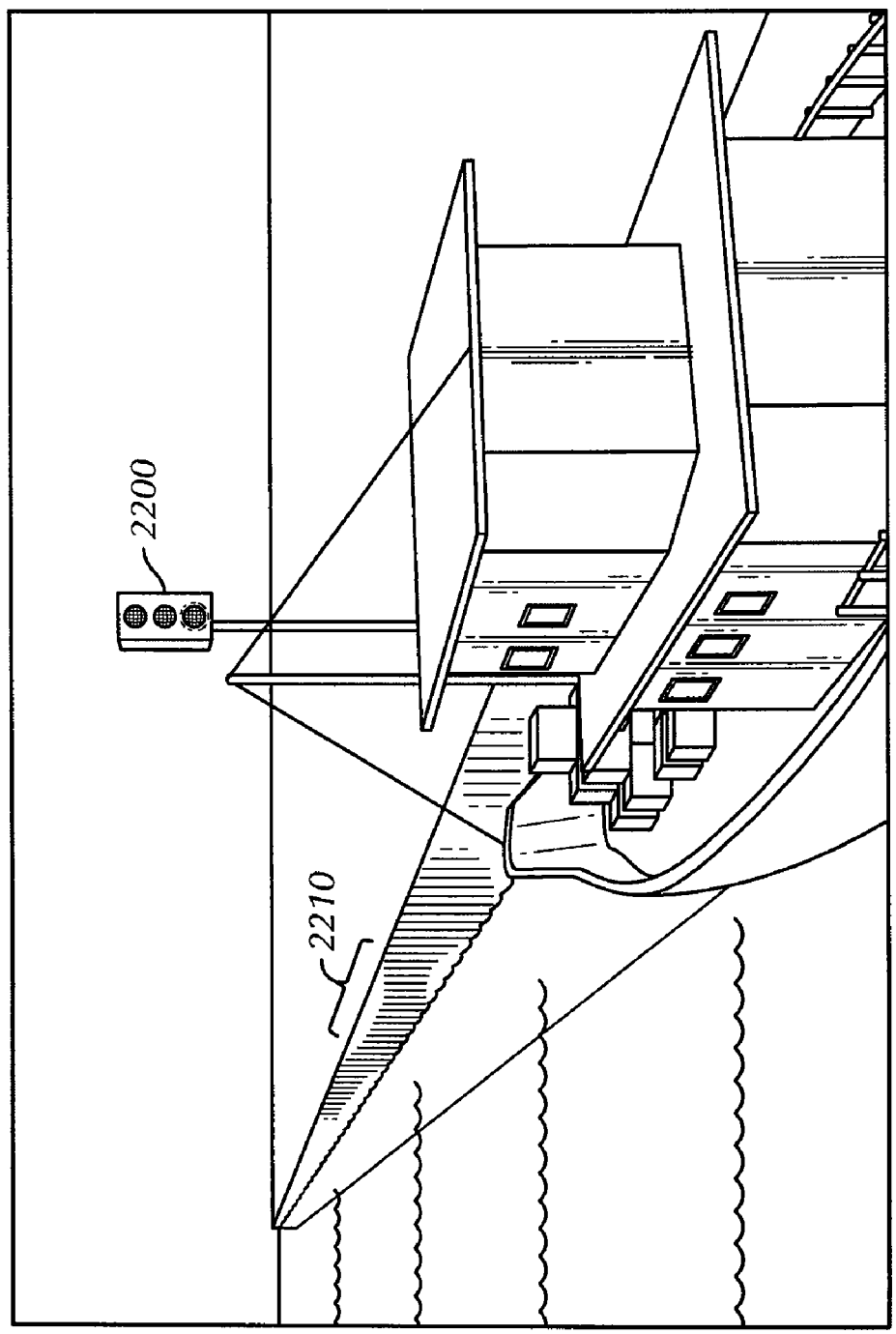
FIG. 22 is a perspective view illustrating a signal controlling exit from the system S.

While the inspected vessel V is being freed from the motion system's cables, its crew observes another traffic light 2200 positioned at the re-embarkation station before sailing away, as shown in FIG. 22. The signal typically has three lights red, yellow and green. Red signals the vessel V to continue to wait, yellow to proceed to a manual inspection dock 2210, following suspicion of the presence of contraband or presence of unusual features giving rise to suspicion, and green to sail away. The light colors and signaling technique are exemplary and illustrative only, and other colors and signaling techniques, including the use of semaphores, textual message and signs, and movable barriers, can be used.

The same process repeats as above for the next vessel to be X-ray scanned. The entire scanning process typically takes a few minutes. Conventional manual inspections typically take much longer to achieve, and may take hours, depending on the vessel and its contents.

The system S has been designed to be a fixed installation built alongside the pier of a customs inspection station. The system S can be constructed at an existing pier or at a pier purpose built for the system S. The system S is generally comprised of the following main components:

Water passage or canal;
X-ray Source;
Arc-shaped Collimator and Detector Array;
Motion System;
Water Displacement Mechanism;
Controls, Subsystems and Ancillaries; and
Structures, Enclosures and Shielding.

As described above, vessels are simply pulled through the water canal or passage (indicated as passage P in FIGS. 1a–1b) by the motion system to be X-ray scanned. During the time the vessels are being scanned, the X-ray source fires a beam fan, in one embodiment a 72° beam fan, which penetrates the vessel structure and onboard cargo. Detector array 176 is attached to the back of the arc-shaped collimator 175 to capture the X-ray signal and feed it to the processing and imaging subsystems.

For the X-ray beam to travel in water and penetrate the submersed parts of the vessel, the water displacement mechanism replaces water with a lighter and less dense air-filled foam material. In one embodiment, the resulting density of the medium X-ray beams travel through below water level is below 30% of that of water; thus allowing X-rays to travel further and penetrate the vessel and cargo. In another embodiment, each of the foam reeds has a density less than one-fifth that of water. A detailed description of how the water displacement mechanism works is provided below.

In order to maximize the image quality, the path taken by the X-ray beam through the water should be minimized. X-rays attenuate over the distance traveled from their source according to an inverse square law, with the amount of attenuation in part depending on the substance through which the X-rays pass. Although X-rays travel through air maintaining acceptable intensity, they quickly attenuate when traveling through water. Indeed, water is used in many situations where shielding from radioactive materials is required.

Water's density compared to steel is approximately 1:7.8, which means that X-rays capable of penetrating 100 mm of steel would completely attenuate when traveling through 780 mm of water. If the highest-powered commercially available 9 MeV source is used, which is capable of penetrating approximately 360 mm of steel, the X-rays generated would only travel through 3.0 m of water then completely attenuate.

Solutions to the water density problem, such as lifting the vessels above water and dry-tank approaches have previously proven impractical.

Instead, the present application discloses displacing or excluding the water, or most of it, away from the path of the X-ray beam while maintaining the vessel floating on water. In one embodiment, a narrow balloon inflates below the vessel, filling the balloon with air. The balloon embraces the vessel's profile, to displace the water along the X-ray path through the water. Alternately, balloons can be positioned alongside the vessel, instead of below the vessel. However, the physical attributes of vessels and the operating environment may make balloon embodiments less preferred.

Figure 2:
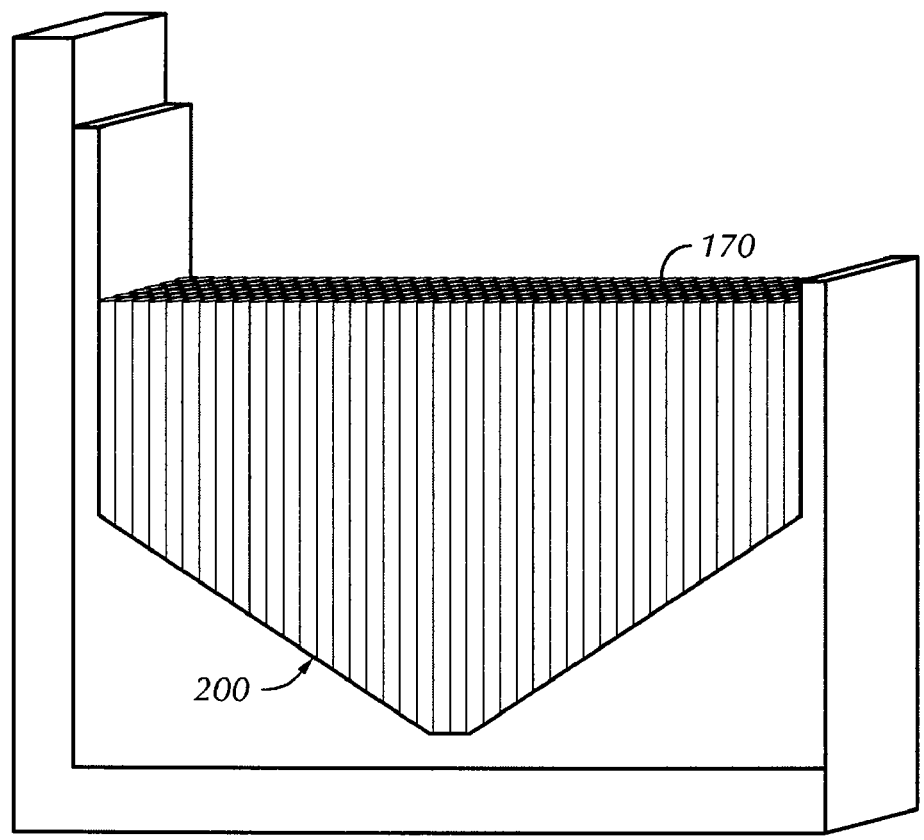
FIG. 2 is a drawing of a cross section of a portion of the system S illustrating one embodiment of a water exclusion section for the system S.
Figure 3:
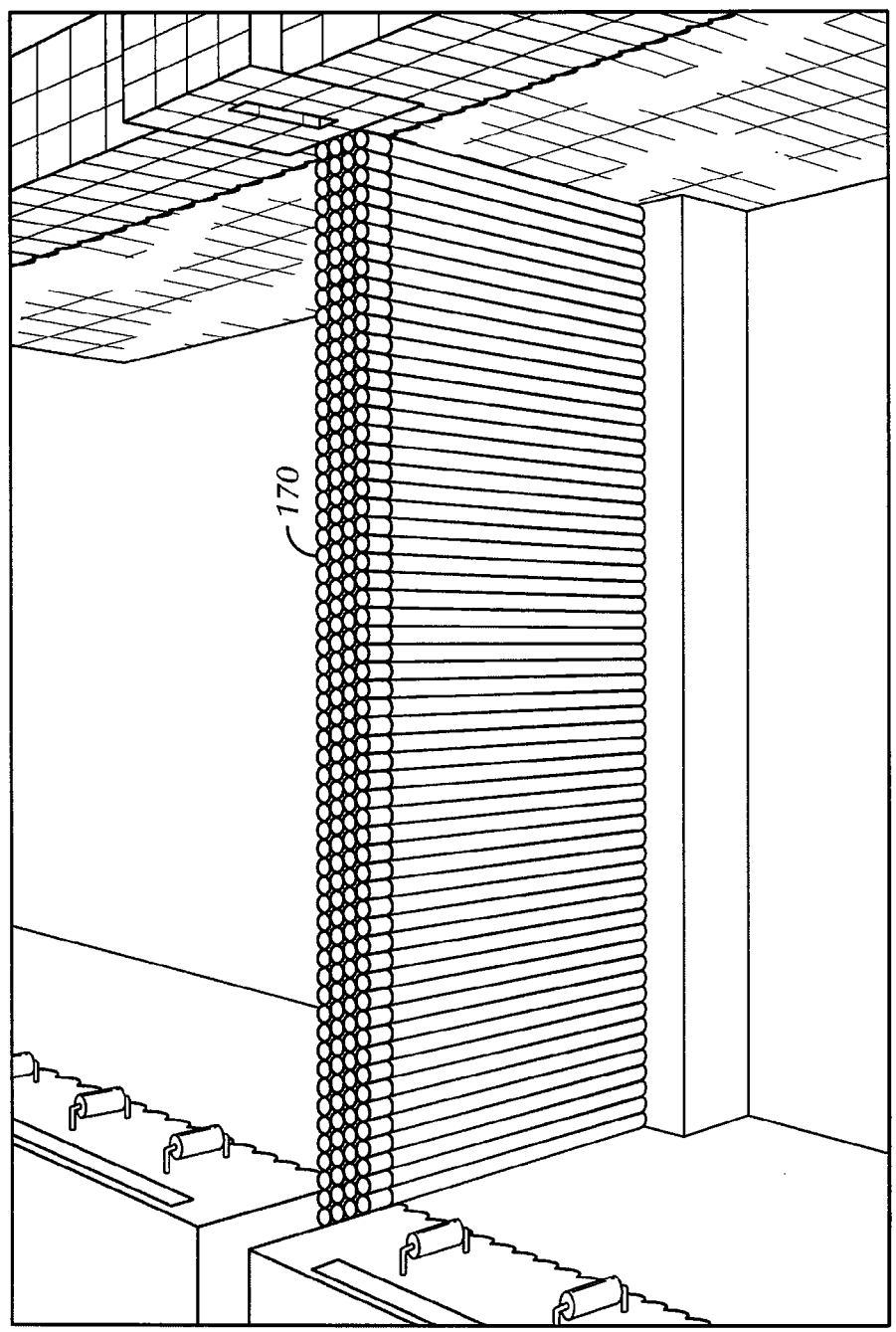
FIG. 3 is a perspective view of the water exclusion section of FIG. 2.
Figure 4:
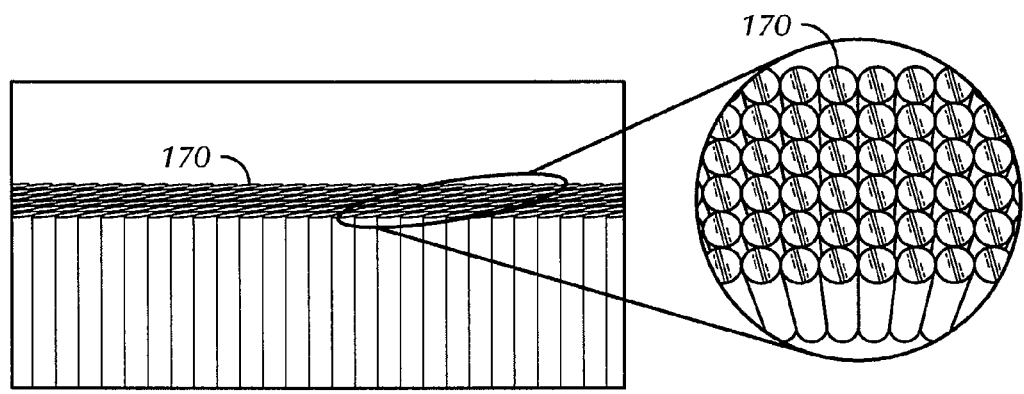
FIG. 4 is a detail view of the water exclusion section of FIG. 6.

In an alternative embodiment, an artificial plantation 170 of densely packed, air-filled exclusion members, such as foam reeds, is affixed at sea bottom or the bottom 200 of the passage P as shown in cross-section in FIG. 2. The exclusion members rise by virtue of their lower relative density above water level, as shown in perspective view in FIG. 3 as the darker portion of the reed plantation 170. As shown in FIG. 2, the exclusion members extend above the water line by a few centimeters but the amount of extension above the water line is not significant. Although FIG. 2 shows the plantation in a rectangular configuration, any desired arrangement of the plantation 170 of exclusion members can be used, as long as the plantation 170 generally covers the X-ray beam path across the passage P. Although as shown in FIG. 2, the bottom 200 of passage P is generally V-shaped, any desired shape can be used for the bottom surface of the passage P. In one embodiment, the plantation of exclusion members is 2 m thick and 14 m wide. These dimensions are exemplary and illustrative only, and other dimensions can be used. The foam reeds can be made of polyethylene resin material that is both flexible and very light, or any other desirable flexible and light material. Preferably, the foam reeds have a closed cell structure and are relatively X-ray transparent, having a density approximately one fifth that of water. As shown in detail view in FIG. 4, the foam reeds can have a circular horizontal cross-sectional configuration. However, hexagonal, or any other desired closely-packed horizontal cross-sectional configuration can be used as desired. If desired, the foam reeds can be coated with a suitable sealant or water-repelling substance.

As shown in FIGS. 1a–1b, the area surrounding the reed plantation 170 can be closed off with dry dock boards in grooves 140, allowing the area to be drained for maintenance of the reed plantation 170.

Before a vessel reaches the X-ray scan beam, the foam reeds displace most of the water with the air encapsulated in their structural cells; thus allowing the X-ray to travel further and reach the collimator 175 and detector array 176 at sufficient intensity.

Figure 5:
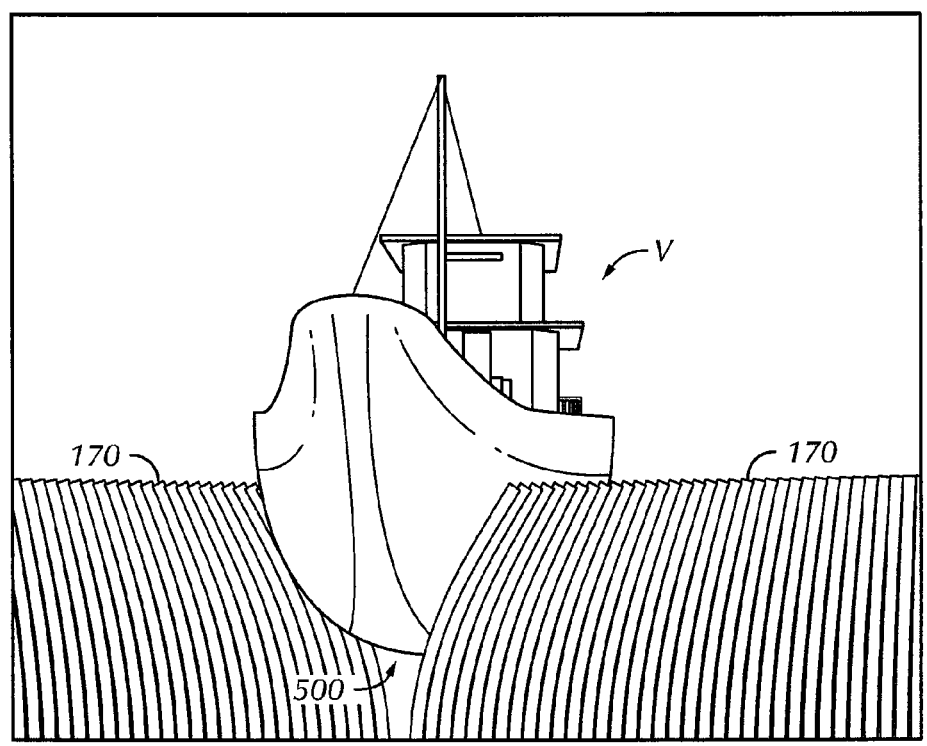
FIG. 5 is an end view illustrating passage of a vessel through the water exclusion section of FIG. 4.

When the vessel passes through the foam reeds and the X-ray beam, as shown in FIG. 5, the foam reeds reshape to allow the vessel hull 500 to pass through them, but continue to embrace the bottom profile of the vessel V. This means that while the vessel V is being scanned, X-rays either penetrate the reeds 170 or the vessel V itself, but eventually reach the collimator and the detectors array with an acceptable intensity. This in turn allows the detector array 176 of the collimator 175 to capture the image information of the submersed portion of the vessel V without too much attenuation by the water surrounding the vessel's hull 500.

The disclosed technique can maintain approximately 70% of the X-ray intensity when traveling underwater to scan the submersed portions of vessels. The resulting X-ray intensity is more than adequate to screen most vessels and the cargos they carry.

Figure 10:
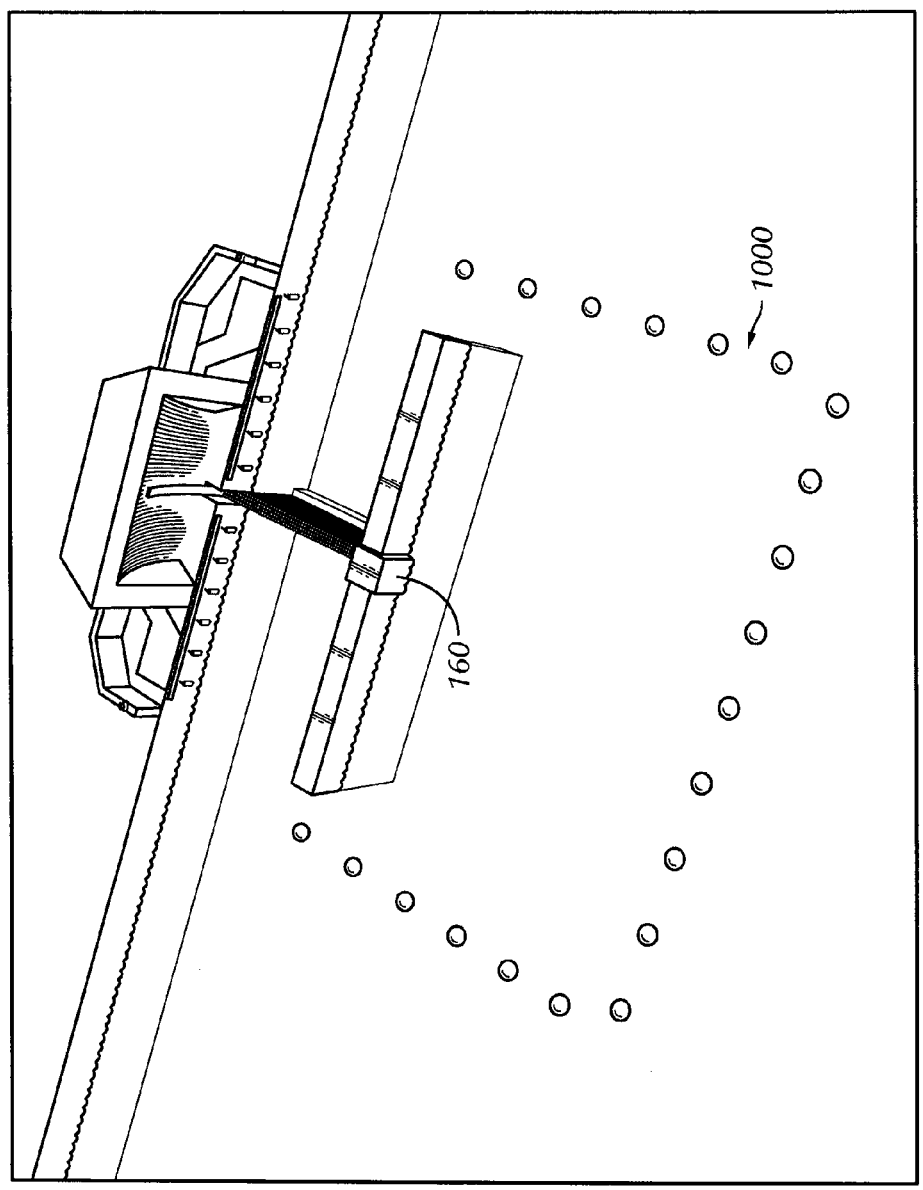
FIG. 10 is a top perspective view of the scanning system S of FIGS. 1a–1b.
Figure 11:
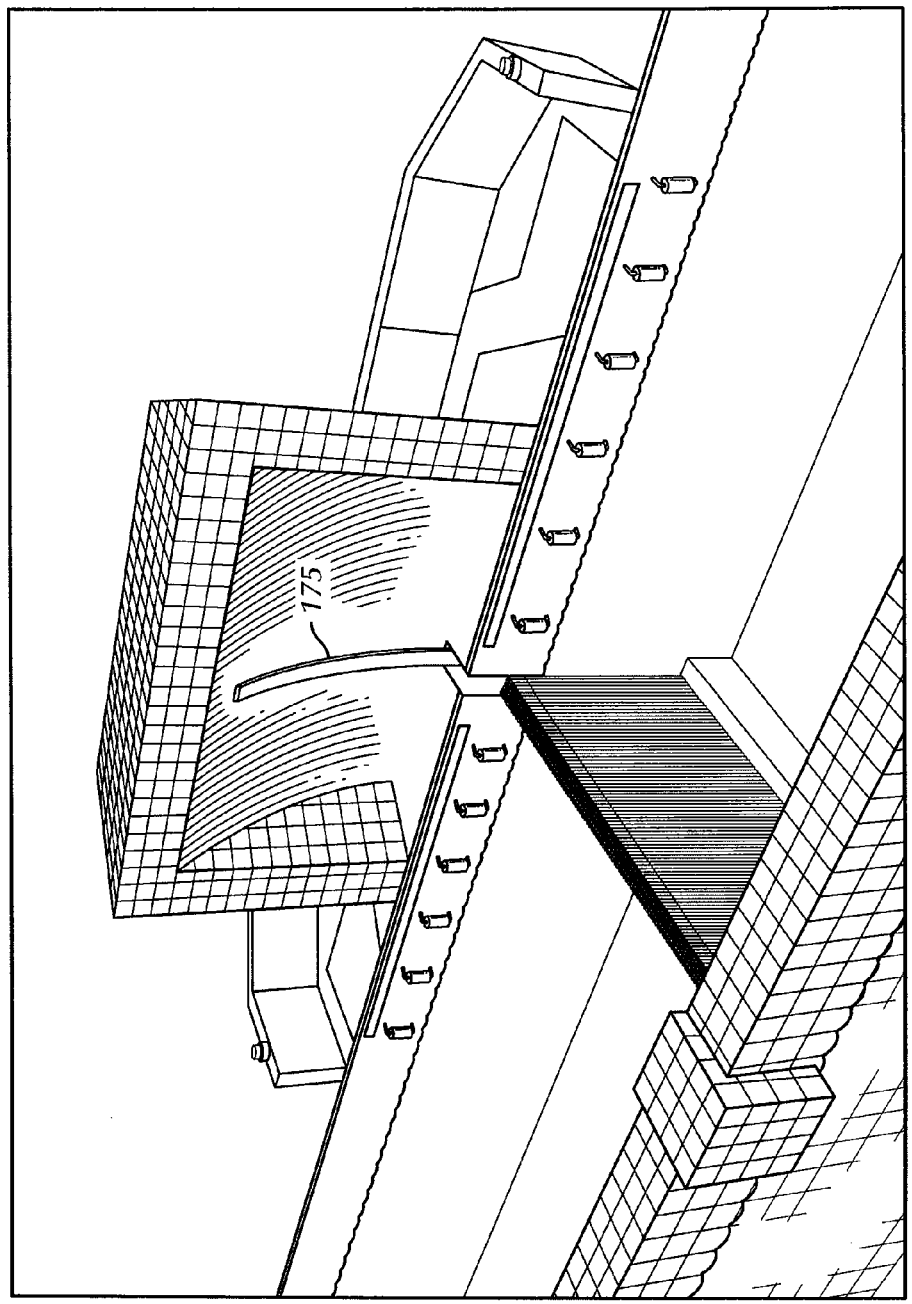
FIG. 11 is a perspective view of a water displacement portion of the system S of FIGS. 1a–1b according to one embodiment.

The X-ray head can be mounted in an environmentally controlled enclosure 160 that rests on a stable platform, facing the dockside. In one embodiment, the platform is between 12 to 16 meters away from the pier 180—the exact dimension being dependent upon the X-ray geometry being employed. As best shown in FIG. 10, an exclusion area 1000 can be provided behind the X-ray enclosure 160 for safety reasons.

Figure 6:
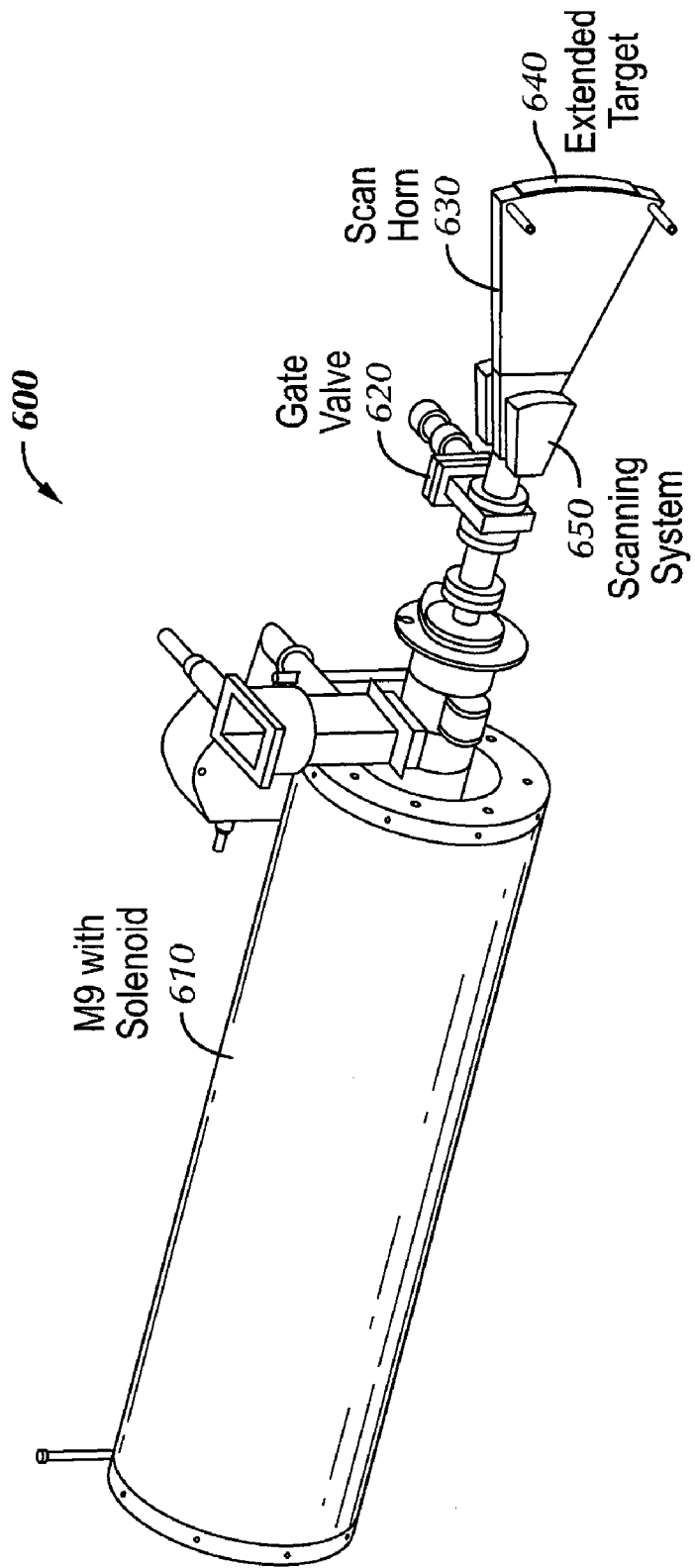
FIG. 6 is a perspective view illustrating an X-ray emitter for the scanning system S according to one embodiment.

In one embodiment, a Varian Linatron-M9™ MeV Linear Accelerator (LINAC) can be used as an X-ray source. Other X-ray sources are known and can be used. The X-ray generation system typically consists of five major components: X-ray head, RF Unit, control console, modulator, and temperature control unit, plus interconnecting cables and hoses. X-ray head 600 is shown in FIG. 6. LINACs have a high degree of reliability, which aids the production of high quality images.

One difficulty faced when seeking the highest possible penetration by a 9 MeV X-ray source is the generated beam fan angle. High-energy 9 MeV sources available today typically generate a pulsed beam fan at 24° and if a 7 m high vessel needs to be scanned, such an unmodified source would need to be placed some 30 m away. A wider X-ray beam fan can make the system more compact and practical. Typically, the requirement of high energy and a wide beam fan are inconsistent.

To create high energy X-rays, electrons are accelerated to high energy and bombard a high atomic number target. As the electrons lose energy in the target, X-rays are emitted. The physics of this emission results in most of the X-rays going generally parallel to the incident electrons. One can think of the X-rays being emitted in a cone that has its axis along the electron direction. As the energy of the electrons get higher, the half angle opening of the cone becomes smaller. At 9 MeV, the intensity of the X-rays drops by 50% at 12° off axis. Therefore, achieving a desired beam fan of 72° typically requires modification of the X-ray system, as discussed below.

Two techniques are disclosed below for changing the angle at which the electrons strike the target. A first technique changes the angle as a function of time and a second technique diffuses the angles of the electrons at all times. A third technique discussed below filters out low intensity photons while spreading the beam fan.

Figure 7A:
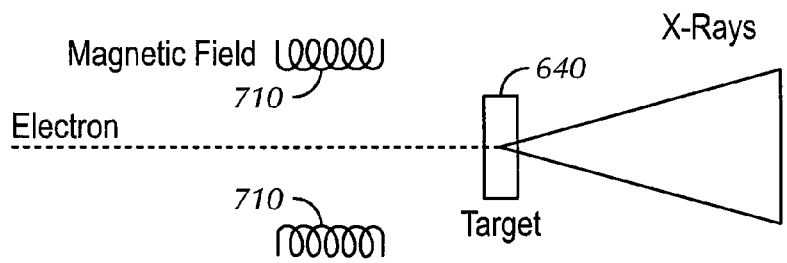
FIGS. 7a–7d illustrate using a magnetic field to direct an X-ray beam.
Figure 7B:
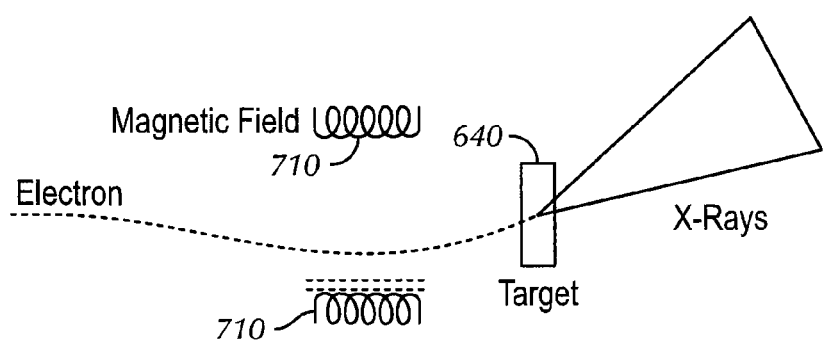

The first technique uses an extended target 640 shown in FIG. 6 and magnetic scanning of the beam by scanning system 650 before the beam strikes the target 640. As discussed above the X-rays from the target tend to go in the direction of the electrons. This is shown schematically in FIG. 7a. Then if the electrons are steered so that they strike the target 700 at an angle, the X-rays are emitted at an angle to the target 700 as shown in FIG. 7b.

Figure 7C:
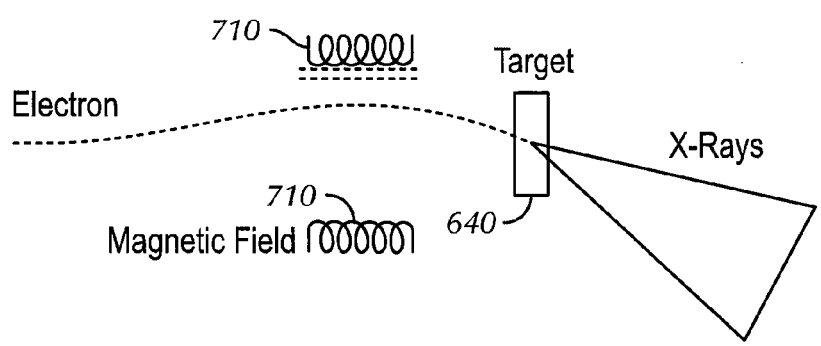
Figure 7D:
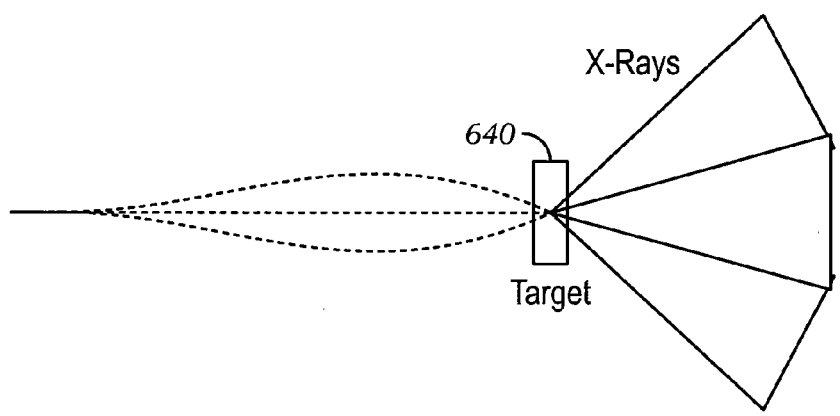
Figure 8:
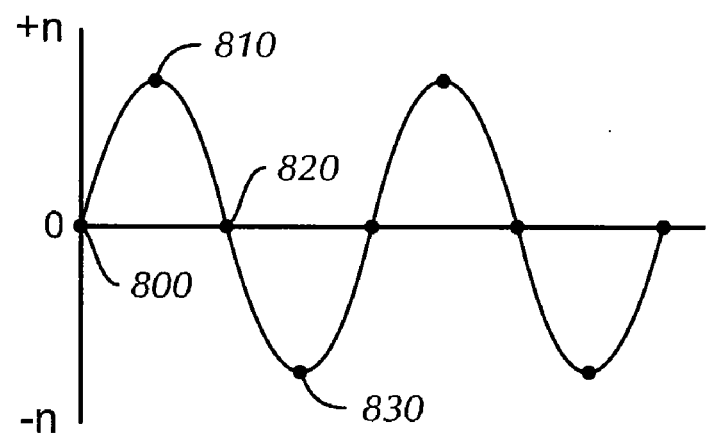
FIG. 8 is a graph illustrating electrons striking a target for an X-ray emitter.

In a similar manner, the electrons could be tilted upwards and the X-rays would be emitted downwards as in FIG. 7c. Therefore, one disclosed technique is to use a sinusoidal magnetic field to deflect the electrons in a way so that they strike the target 640 with an angle that varies in a sinusoidal manner, combining the aiming of FIGS. 7a–7c, as shown in FIG. 7d. With a pulsed source, one can arrange to accelerate electrons when the magnetic fields reach their maxima in two directions and when the field is zero. This would mean that the electrons would strike the target at zero degrees, +n degrees, zero degrees, −n degrees, zero degrees, etc., as shown in FIG. 8.

The line represents the magnitude of the magnetic field (zero is the middle of the graph) and the dots represent the time at which the pulsed X-ray source is fired. Therefore, this results in an image being created by taking a number of sub-images and combining them. The first image (the first dot 800 in FIG. 8) is taken of the middle of the vessel V; the second image is of the top section of the vessel V at dot 810; the third image is of the middle of the vessel V at dot 820; the fourth is of the bottom of the vessel V at dot 830, etc. These sub-images are then mathematically combined to obtain the full image of the vessel V.

Figure 9:
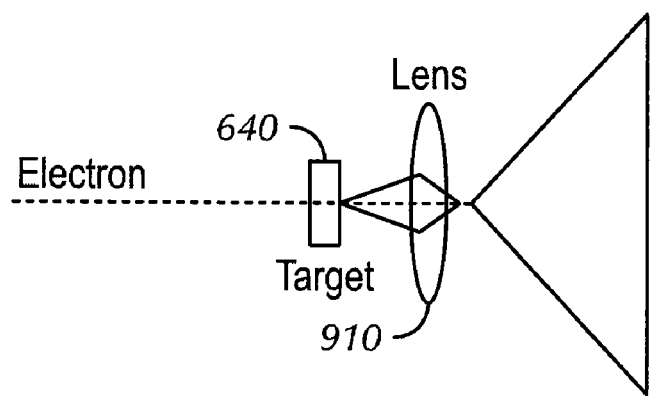
FIG. 9 is a drawing illustrating electron dispersion using a lens according to another embodiment.

The second technique is similar to the first technique in that it uses electrons that arrive at the target 640 at different angles to create a wider beam of X-rays, but instead of creating different angles at different times this technique creates a broad range of electron angles to strike the target at all times. If one remembers simple optics, a parallel beam of light (coming in from the left in FIG. 9) passing through a lens 910 can be focused to a point and then disperses beyond that point.

In other words, a broad beam with no angular dispersion can be converted to a small beam with large angular divergence. However, this is exactly what is needed for a wide fan angle. The angular divergence of the X-rays is that of the electrons plus the angular spread that would normally occur for parallel electrons. There are both electrostatic and electromagnetic lenses that could be used for this technique.

The major design issues with this technique are the lens 910 design and beam size. Cylindrically symmetric electromagnetic and electrostatic lenses are well known and there are excellent design tools and guidelines available. However, for a scanning system such as disclosed herein, it is essential that the lens 910 be a cylindrical lens, because one wants angular dispersion only in the plane of the beam fan and not dispersion perpendicular to the fan, as it would reduce flux in the fan.

Normally X-ray sources are designed to produce a very compact bundle of electrons. Lens design may be made easier by having an electron beam that is larger in extent and possibly elliptical.

Both techniques are equivalent in flux. In the first technique, the full flux is available over ⅓ of the range at any given time. In the second technique, ⅓ of the full flux is available over the entire angular range at any given time. Both techniques produce equivalent images using a time-averaged mean, even though instantaneous flux levels differ.

Research has shown that a 9 MeV emitter with a beam fan expanded beyond 24° degrades less for high intensity photons than for lower intensity photons. An alternate embodiment involves filtering low intensity photons from the beam. With this technique, beam scatter is also reduced, allowing a reduction in radiation shielding requirements. The disclosed technique uses a filter placed close to the emitter. One embodiment was a 40 mm thick polymer embedded in a first collimator. Other, filter types, thicknesses, and placements can be used. Filtering low intensity photons will typically reduce the quantity of high intensity photons arriving at the detector array 176 by only a small amount. Using larger photon detectors can compensate for the lower quantity of photons, although at a cost of a lower definition image. However, for a vessel inspection system, penetration is of greater concern than fine spatial resolution, because viewing small details on a large vessel is typically not necessary to locate hidden compartments.

Figure 25:
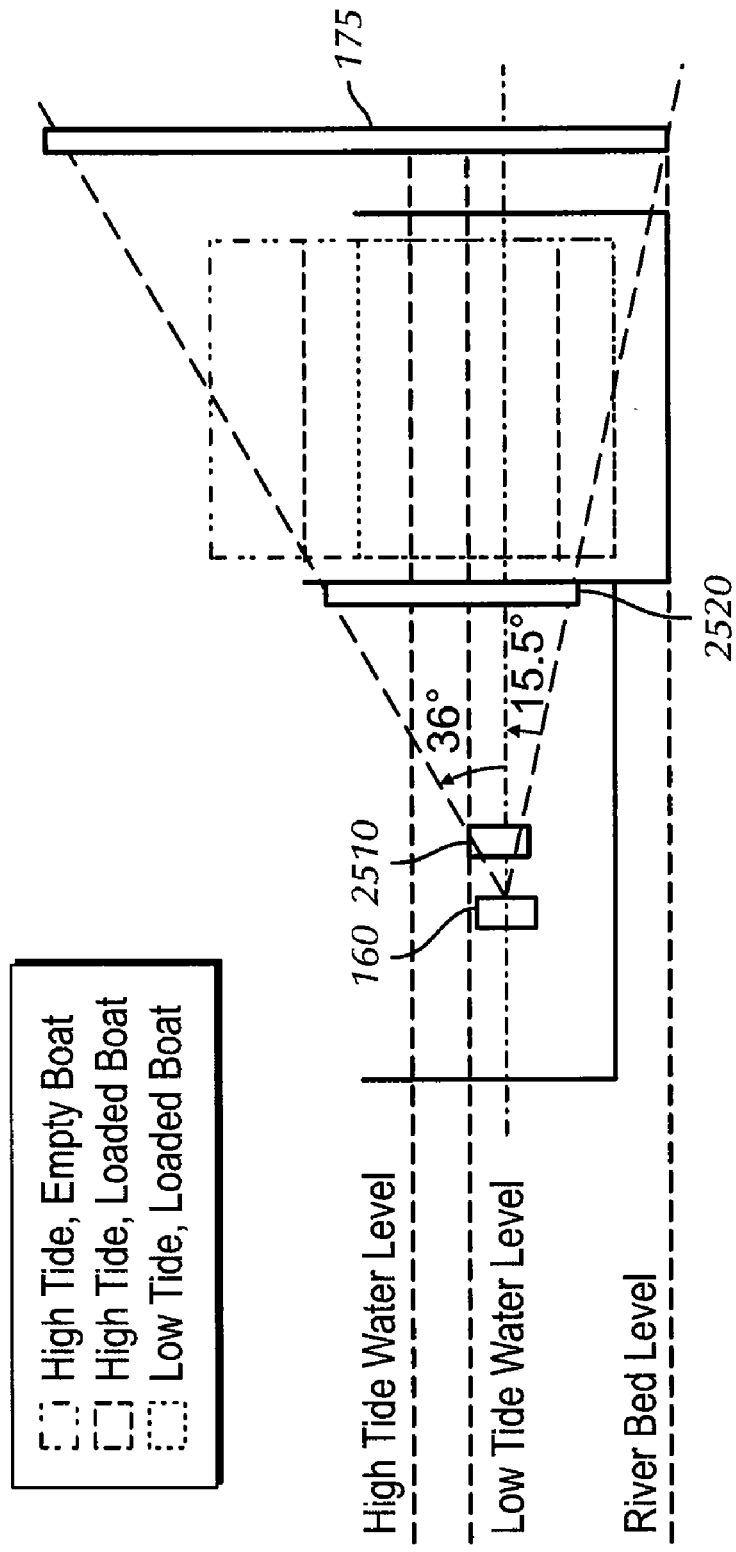
FIG. 25 is an elevation view illustrating an asymmetric beam fan radiation emitter and collimators for the system S according to one embodiment.

An embodiment of this technique illustrated in FIG. 25 asymmetrically expands the beam fan beyond the conventional 24° angle and filters low intensity photons. A first collimator 2510 is placed close to the X-ray emitter 160 and the filter 2515 is embedded in the collimator 2510. A second collimator 2520 is placed as close as possible to the vessel being scanned, based on the largest vessel for which the system is designed. The third collimator 175 is placed on the other side of the passageway P with the detector array 176, providing X-ray noise shielding for the detector array 176. As shown in FIG. 25, the emitter's beam fan is opened to 36° above horizontal and 15.5° below horizontal, allowing full coverage of unloaded and loaded vessels, regardless of whether the water level is at high tide or low tide. However, other beam fan angles can be used as desired. The number, configuration, and placement of collimators illustrated in FIG. 25 is exemplary and illustrative only, and other numbers, configurations, and placement of collimators can be used.

Figure 13:
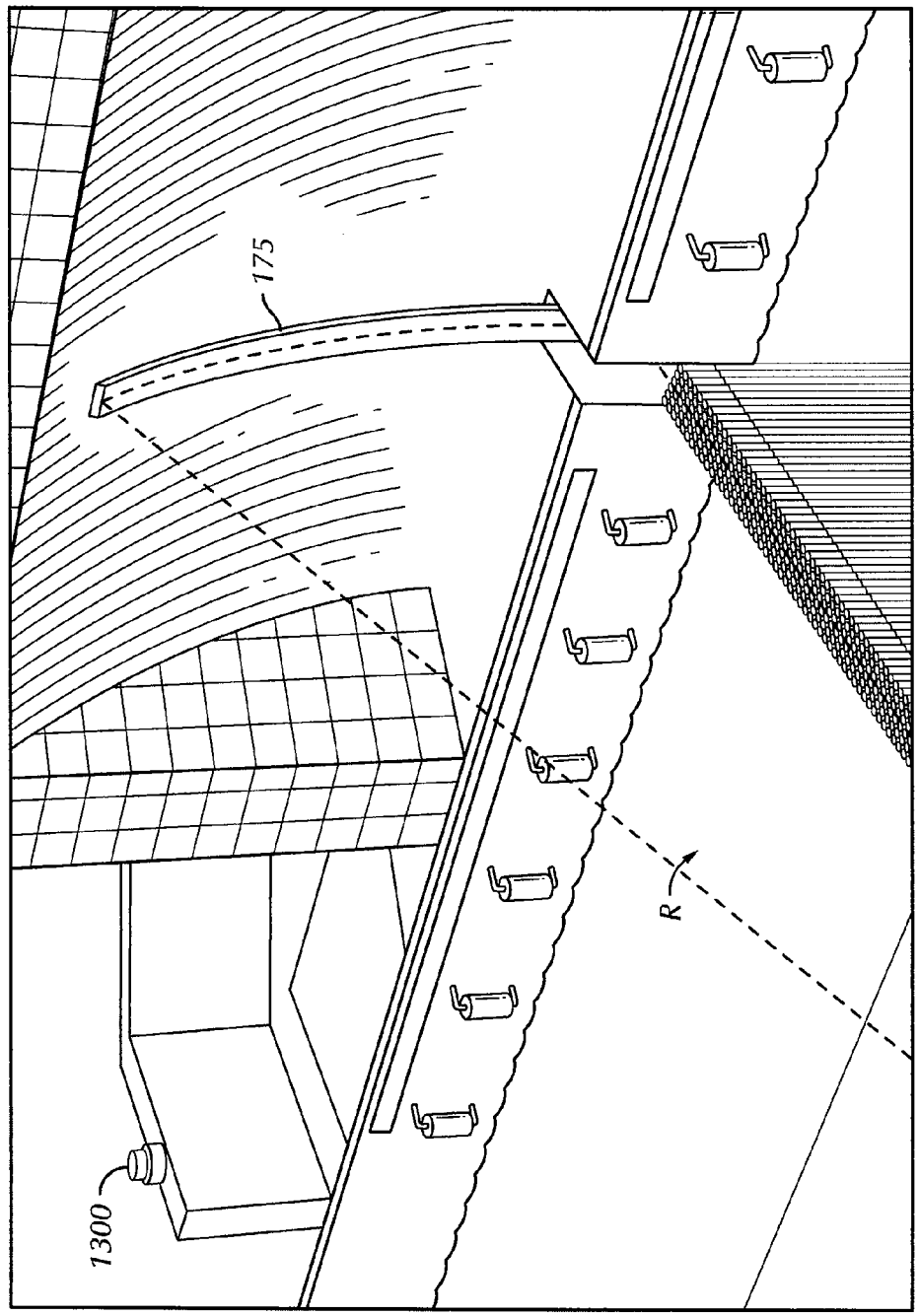
FIG. 13 is a perspective view illustrating a radiation beam received by an arc-shaped collimator according to one embodiment.
Figure 14:
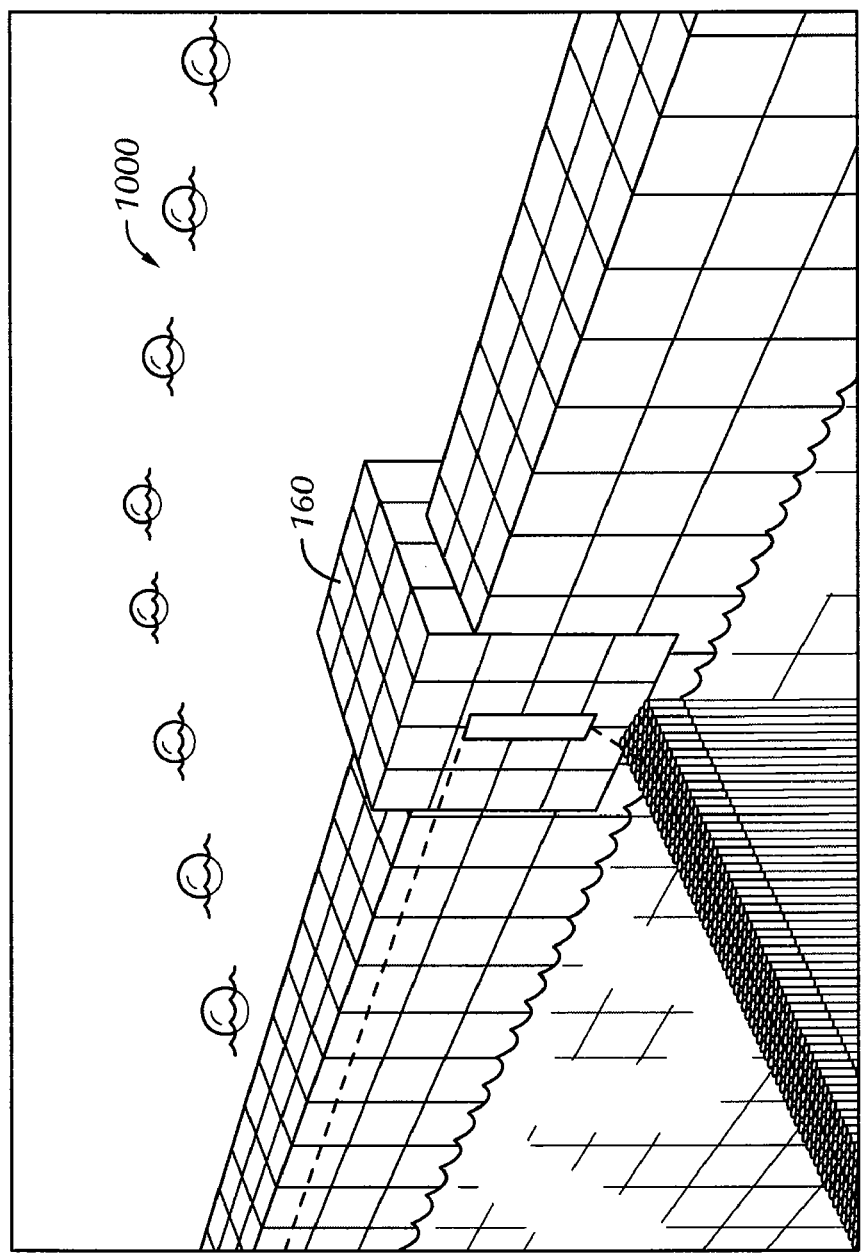
FIG. 14 is a perspective view of the radiation emitter generating a radiation beam according to one embodiment.

Experience has proven that an arc-shaped X-ray detector array 176 and collimator 175 typically produces superior images than the more conventional "I" or "L" shaped arrays. That is simply because the detector elements and collimator 175 are aligned at a perpendicular angle to the conical X-ray beams as shown in FIG. 13, thus capture their full intensity with no image distortion. However, the difficulty of construction of a large arc-shaped X-ray detector array 176 can be large, and a straight vertical X-ray detector array 176 and final collimator 175 can be used, such as illustrated in FIG. 25.

The collimator 175 and the detector array 176 need to be quite large to capture X-rays projecting a 7 m high vessel image. The system S would have an approximately 17 m tall collimator that has about half of its height going under water level, which presents additional structural challenges.

Figure 24A:
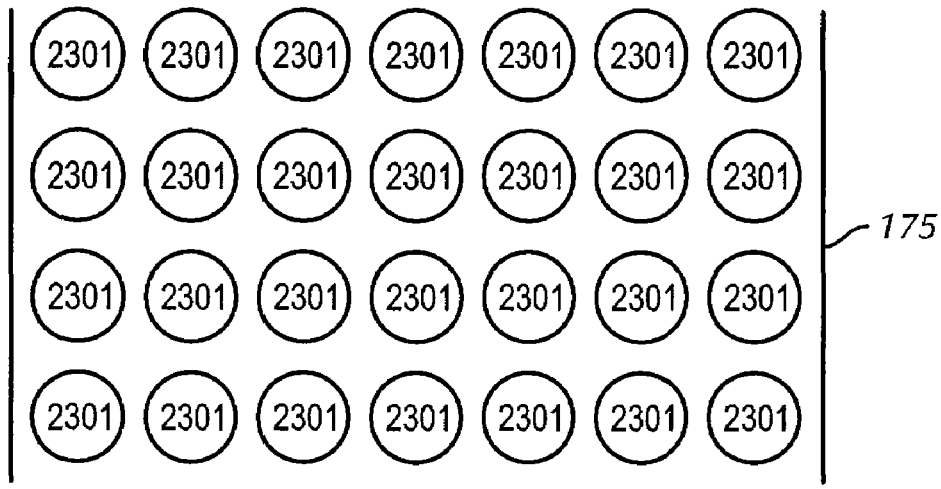
FIGS. 24a–24b are front and back views illustrating a portion of the collimator for the system S and an exemplary arrangement of apertures and array elements.
Figure 24B:
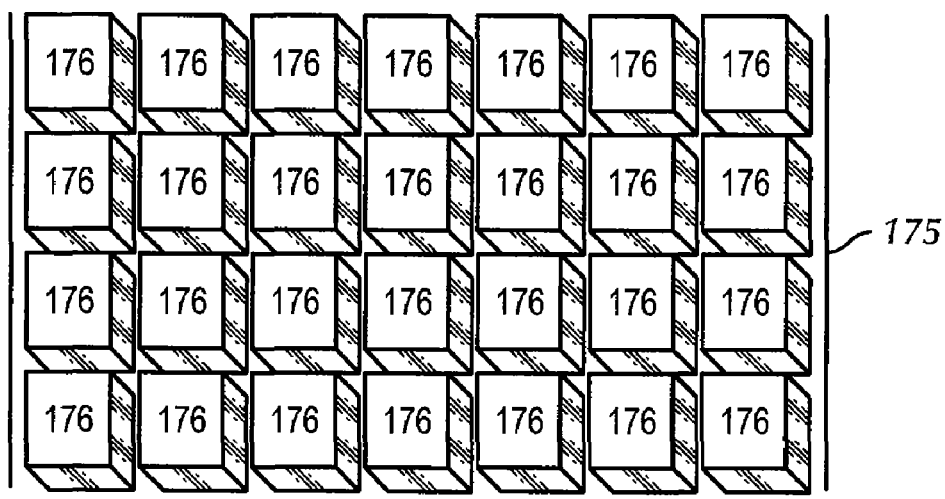

The collimator 175 has two main functions. First, it has apertures machined across its depth for every detector array 176 element affixed to its back. These holes filter reflected and diffracted X-rays from hitting the detectors and allow only those perpendicular X-rays to pass through. FIG. 24a illustrates a front view of a portion of the collimator 175, showing the apertures 2301 machined across its depth. FIG. 24b illustrates a back view of the portion of FIG. 24a, showing the array elements 176 affixed to its back lined up with the apertures 2301. The size, number, and arrangement of apertures 2301 and array elements 176 is exemplary and illustrative only, and any suitable size, number, and arrangement of apertures and array elements can be used. This aperture technique reduces image clutter and optical noise. Second, the collimator 175, which is preferably made of steel, acts as a beam stop and helps weaken X-rays, so they do not scatter too far. In addition, the collimator 175 provides protection to the detector electronics from the X-ray radiation thus increasing the useful life of the electronics.

The large structure of the collimator 175 typically necessitates that it be built and erected in sections. Moreover, for periodic maintenance purposes, a deep maintenance stairwell can be dug on the pier behind the collimator.

Each individual element in the detector array 176 affixed to the back of the collimator 175 comprises a scintillating crystal and photodiode. Each crystal is optically coupled to a separate photodiode, with both X-ray and optical screening being provided between each of the detector elements.

An array of X-ray detector boards can be used for data collection. X-ray detector boards are available from a number of manufacturers. One such board is the CXDA X-ray detector board manufactured by L3 Communications, Inc. In one embodiment, each individual detector element in the array comprises cadmium-tungstate scintillating crystals that have demonstrated a superior performance. Each crystal is optically coupled to a separate photodiode, with both X-ray and optical screening being provided between each of the detector elements.

The height of each crystal in one embodiment is 4 mm. Allowing for the screening between the crystals, the pitch of the crystals is 4 mm. Detector elements can be arranged in banks or modules. Each module can be mounted directly on the back of collimator 175 or using other suitable mounting techniques. Other heights and pitches can be used, varying between 4 mm and 12 mm. In embodiments using a filter to filter low intensity photons, 12 mm detectors may be preferred to obtain satisfactory photon detection of the reduced quantity of high energy photons.

Unlike normal lower energy tubes, the 9 MeV Linatrons used in some embodiments are pulsed X-ray sources. The detector electronics can be especially designed to work with a pulsed X-ray source such as the 9 MeV Linatron described above.

The electronics are preferably designed to be very flexible. The system can be programmed to sample and sum as many pulses as required without any hardware changes. This makes it possible to alter the scan speed and integrate over more pulses in the same system.

The signal from each photodiode is integrated within the module during the firing of the X-ray pulse. The integrated signal is then sampled and digitized between pulses thus eliminating any noise that might be induced during the firing of the X-ray source.

Each detector is pointing directly at the X-ray source. This reduces cross talk, improving the clarity of the image formed. The complete array is housed in a light proof housing where data from the array is captured using proprietary electronics. A computer near the array initially collects the captured data and then transmits it via an Ethernet to the operator's inspection station in the control room 120.

There are five factors that should be taken into consideration when designing a system's geometry and scan envelope. Those are the size profile of different vessels, the vessel's cargo load, the tide level, the distance from the X-ray source to the collimator and the distance X-ray beams need to travel under water to scan the submersed portions of vessels, and the depth of the collimator that needs to go below water level.

The geometry of one embodiment provides a scan envelope of vessels measuring up to 7 m by 7 m by 30 m, whether empty or loaded, and whether the tide is high or low.

Such scan envelope would cover more than 95% of vessels in some areas. Larger vessels would need to be inspected by existing conventional methods. An oversize detector can be installed prior to entry to the water scan canal so that oversized vessels are rejected and signaled to bypass the scanning system area. Those oversize vessels can then be directed to an area for manual inspection.

A winch type vessel pull-through system can be used to 'pull and guide' the vessel V past the detector array system 176 mounted on the collimator 175.

The motion system is typically comprised of two synchronized winches 154 and 155, such as shown in FIG. 1b. However, a single winch and cable system, such as the winch 155 and cable 156 shown in FIG. 1a can be used. A cable 158 from the first winch 154 stretches from the disembarkation station 100 to the aft of the vessel V and a cable 157 from the second winch 155 stretches from re-embarkation station 150 to the fore of the vessel V. The winch drives, typically electrical, can be electronically coupled such that they move in unison in a manner such that the winches 154 and 155 release equal amounts of cable.

The front pull-through winch 155 and cable 157 provide a pulling force for forward motion and a dragging force towards the pier 180. The rear winch 154 provides a predetermined amount of tension in the drag cable 156 and helps to control the uniformity of traverse speed. Additionally, the rear winch 154 and cable 158 can also provide a dragging force towards the pier 180 thus ensuring the vessel V is against the pier 180 or at a predetermined distance from pier 180 at all times during the scanning process.

The combined function of the two winches 154 and 155 provide a "pull and guide" action for the vessel V past the X-ray emitter 160 and the detector array 176. A similar pull and guide action is achieved by the single winch embodiment of FIG. 1a. To avoid damage to the vessel, long rubberized rollers 165 mounted in a vertical orientation can be attached to the pier so that there is no rubbing of the pier against the vessel hull. The rubber faces of the rollers avoid damage to the vessel hulls. The rollers also ensure the vessel V is kept a predetermined distance from the side of the water passage P during transit of the system S. Although shown in FIGS. 1a–1b with 11 rollers 165a–165k, any number of rollers can be used as desired.

The overall system control can use an Allen Bradley or similar programmable logic controller (PLC) housed in an appropriate panel.

In one embodiment, communication and control of the control system and the associated devices adheres to the Actuator Sensor-Interface (AS-I) standard. The specification of the AS-I standard is described in Werner R. Kriesel & Otto W. Madelung, *AS-I Interface The Actuator-Sensor-Interface for Automation* (2nd ed. 1999) and discussed in the following patents (all said patents are incorporated by reference in their entirety): U.S. Pat. No. 6,294,889 for a Process and a Control Device for a Motor Output Suitable for being Controlled through a Communication Bus, U.S. Pat. No. 6,378,574 for a Rotary Type Continuous Filling Apparatus, U.S. Pat. No. 6,332,327 for a Distributed Intelligence Control for Commercial Refrigeration, U.S. Pat. No. 6,127,748 for an Installation for Making Electrical Connection Between an Equipment Assembly and a Command and Control System, U.S. Pat. No. 6,173,731 for an Electrofluidic Modular System, U.S. Pat. No. 6,222,441 for a Process and Circuit for Connecting an Actuator to a Line, U.S. Pat. No. 5,978,193 for a Switchgear Unit Capable of Communication and U.S. Pat. No. 5,955,859 for an Interface Module Between a Field Bus and Electrical Equipment Controlling and Protecting an Electric Motor.

The Human Machine Interface (HMI) can be an Allen Bradley Panel View™ or similar touch screen panel. This can form the master control panel. The LINAC and X-ray logic controllers can act as slaves to the master control system. Diagnosis of common faults and service warnings can be provided by the HMI. All electrical panels and motors should have a minimum of International Electrotechnical Commission (IEC) IP55 protection rating.

Signals from the detector array 176 can be fed to a number of ADC (Analog to Digital Converter) boards. The signals can be conditioned and digitized for processing. A ruggedized server containing the ADC boards can be housed in an environmentally controlled panel or building local to the detector array 176, thus reducing the possibility of signal degradation that can result from long distance transmissions.

Using the feedback data of the actual speed from the pull-through system, software can be used to form images of the scans. Preferably, an adaptive histogram equalization software technique is used for image analysis. One such technique is the Deepscan software produced by L3 Communications. However, other types of image analysis software known in the art can be used as desired. For identification purposes, the scan can be given a unique identification number and held in a file identified by the unique number that has been created.

The image can be displayed on the next available analysis screen ready for the inspector to review. The system S can be configured with any desired number of analyst workstations. In most embodiments, two analyst workstations should be sufficient for desirable throughput.

Figure 23:
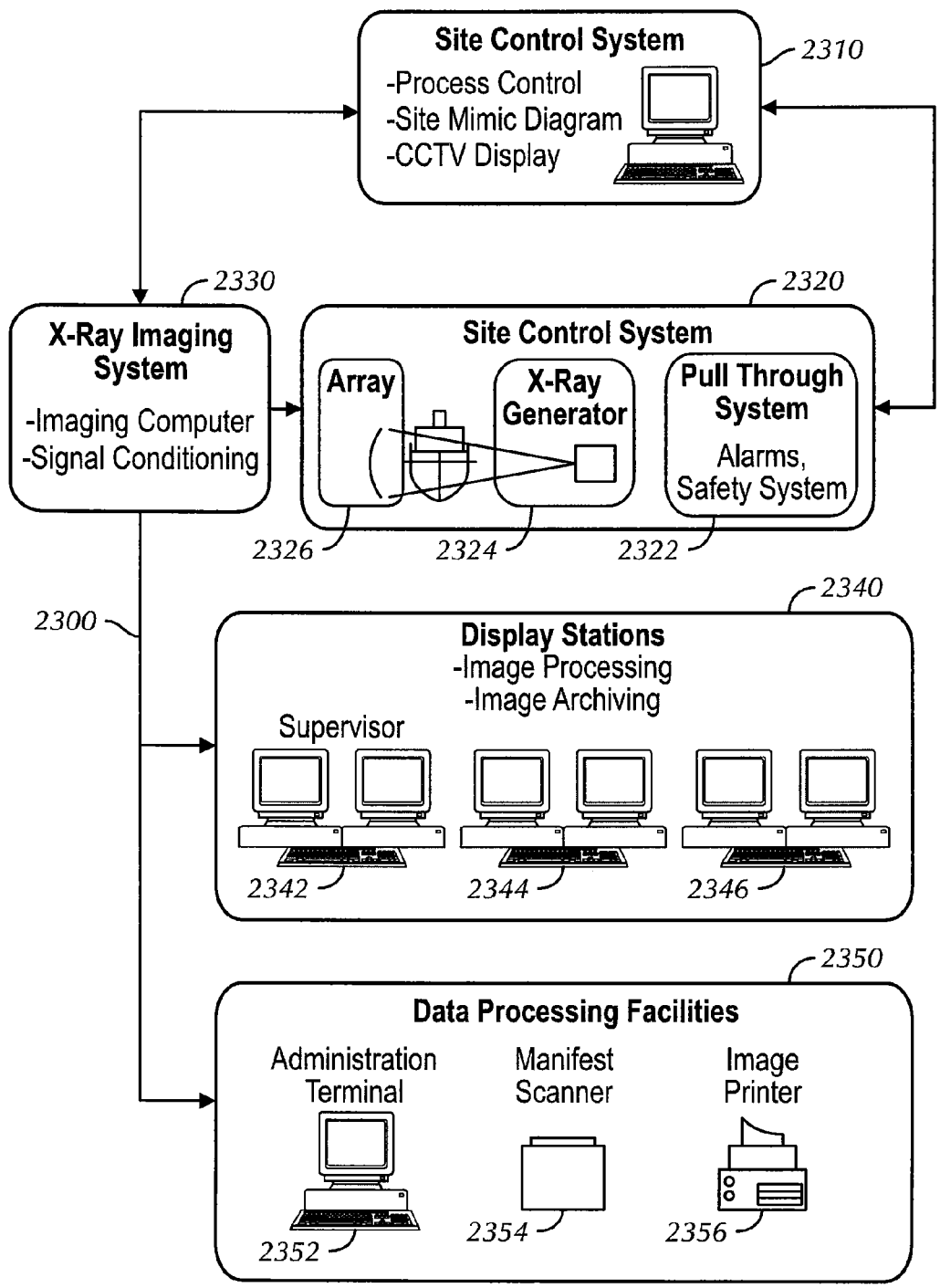
FIG. 23 is a graph illustrating exemplary components of a computer facility for the system S.

FIG. 23 illustrates an exemplary collection of computer and control subsystems for the system S. A site control system 2310, including a site control workstation 2312 for use by the site marshal or other site control personnel, allows monitoring the function of the system S, including the CCTV cameras 135, process control functions and a site mimic diagram.

The X-ray imaging system 2330, typically housed near the collimator 175, provides signal conditioning and image processing for the detector array 176. An inspection area control subsystem 2320 provides a control logic 2322 for the vessel transport system, as well as the safety alarms and the signal lights to indicate for vessels to enter and exit the system S. Control logic 2324 controls the operation of the X-ray emitter 160, while control logic 2326 controls the detector array 176. A display station subsystem 2340 provides the display stations for inspection personnel. In one embodiment, the display station subsystem 2340 provides a supervisory station 2342 and two analyst workstations 2344 and 2346 for image processing and image archiving as described below. Additional data processing facilities 2350 can provide a scanner for scanning vessel manifests 2354, and an image printer 2356, as well as a system administration terminal 2352. A network 2300, such as an Ethernet network, connects the various subsystems shown in FIG. 23.

Each inspection station can be equipped with a high resolution 32 inch LCD or other desired size or type monitor with any desired aspect ratio, shown in FIG. 18 as display 1800. The inspection stations can have freestanding image processing units connected to a central server, which are used for data storage purposes. Ergonomically designed workstations can provide a comfortable working area for the image analyzers.

On completion of processing, the inspectors can able to record their findings of the image, which are stored in a file created for the vessel V. This record may be typed onto a preformatted form or otherwise input for storage and future use.

The images can be stored on a local server for up to 4 weeks or any other desired period after which they can be migrated to a back-up media. Other information can also be stored for future inspections of the same vessel. In one embodiment, stored images from previous inspections can be presented to the analyst for comparison with the current configuration. Even though the configuration of the cargo may change from inspection to inspection, comparing the configuration with previous configurations can prove useful for the analyst. Various techniques can be used to assist the analyst in the comparison.

In one embodiment, a vessel entering the system can be given a tag or other kind of marker indicating the vessel has been scanned previously, to aid in locating previous scan records. Alternately, a vessel entering the system for the first time can be assigned a unique identification data for the current and future scans of the vessel.

The analyst workstations can be housed in a control room 120 that is environmentally protected and air-conditioned to provide a pleasant working environment conducive to inspectors. The image processing hardware can also be housed in this room (typically, in a separate section) or in a separate room, thus ensuring a controlled environment during operation.

One or more display stations can be connected to the system, although only one is shown in FIG. 18 for clarity of the drawing. There is no requirement for the operator to analyze the image in real time. The system can wait until an inspector is ready before sending the next available image.

Workstation computers can be configured with an appropriate processor, suitable amounts of memory, such as 1 GB SDRAM, and a network interface, such as a 1000BaseT Ethernet Interface. A keyboard allows for entry of user data and access to the archive system. A pointing device provides for manipulating the data on the screen. Exemplary pointing devices include a mouse, roller ball or touch pad. A microphone can be used for voice annotation integrated with the image. DVD archive storage provides up to 3000 images per DVD. Other storage media can also be used. Other commonly-available workstation peripheral devices can also be used as desired.

Multiple objects scanned in single sequence can be viewed serially.

The operating system software can use the Microsoft Windows® operating system from Microsoft Corporation, which has become widely accepted as a stable and open operating system. However, other operating systems can be used.

Software for the analyst workstation allows examining and manipulating vessel and cargo images. In one embodiment, the software is optimized for handling 16-bit image data. The workstation software in one embodiment is based on an open object-oriented development methodology using VC++. This applications software should be compatible with other applications used on the workstation. The workstation is preferably compatible for interfacing with other systems used by customs personnel. Depending upon the nature of the desired functionality and modifications needed for interfacing with such other software (if any), additional software may be required. As noted above, the workstation preferably includes image analysis software using an adaptive histogram equalization technique, but other image analysis software techniques can be used. One such adaptive histogram equalization software is the Deepscan software from L3 Communications.

Several functions are available to the image analyst. One of these functions is indicated by window 2010 in FIG. 20, allowing display of an image of the vessel that has been scanned. Pseudo color manipulation can be employed, using a 24-bit color pallet in one embodiment. The analyst can expand any part of an image to show the maximum amount of data, i.e., one pixel in the X-ray image can be mapped onto at least one pixel on the display. Various zoom levels, such as ¼, ½, 1, 2, 4, 8 times zoom, are available. The analyst can preferably display the entire scan on the screen at once. The analyst can adjust the contrast in the image. Edge enhancement software allows emphasizing any edges in the image.

The analyst can alter the way the image data is mapped onto the gray scale. This can include gray level windowing as well as options such as logarithmic mapping. Inverse video views can be used. Contrast windowing (automatic or manual), logarithmic correction & histogram equalization, adaptive histogram equalization, and other desired image enhancement techniques can be used as desired. One adaptive histogram equalization technique is the Deepscan software of L3 Communications.

The analyst can mark suspicious areas of the image, such as areas 2030 and 2040 of image 2050, illustrated in FIG. 20.

Figure 21:
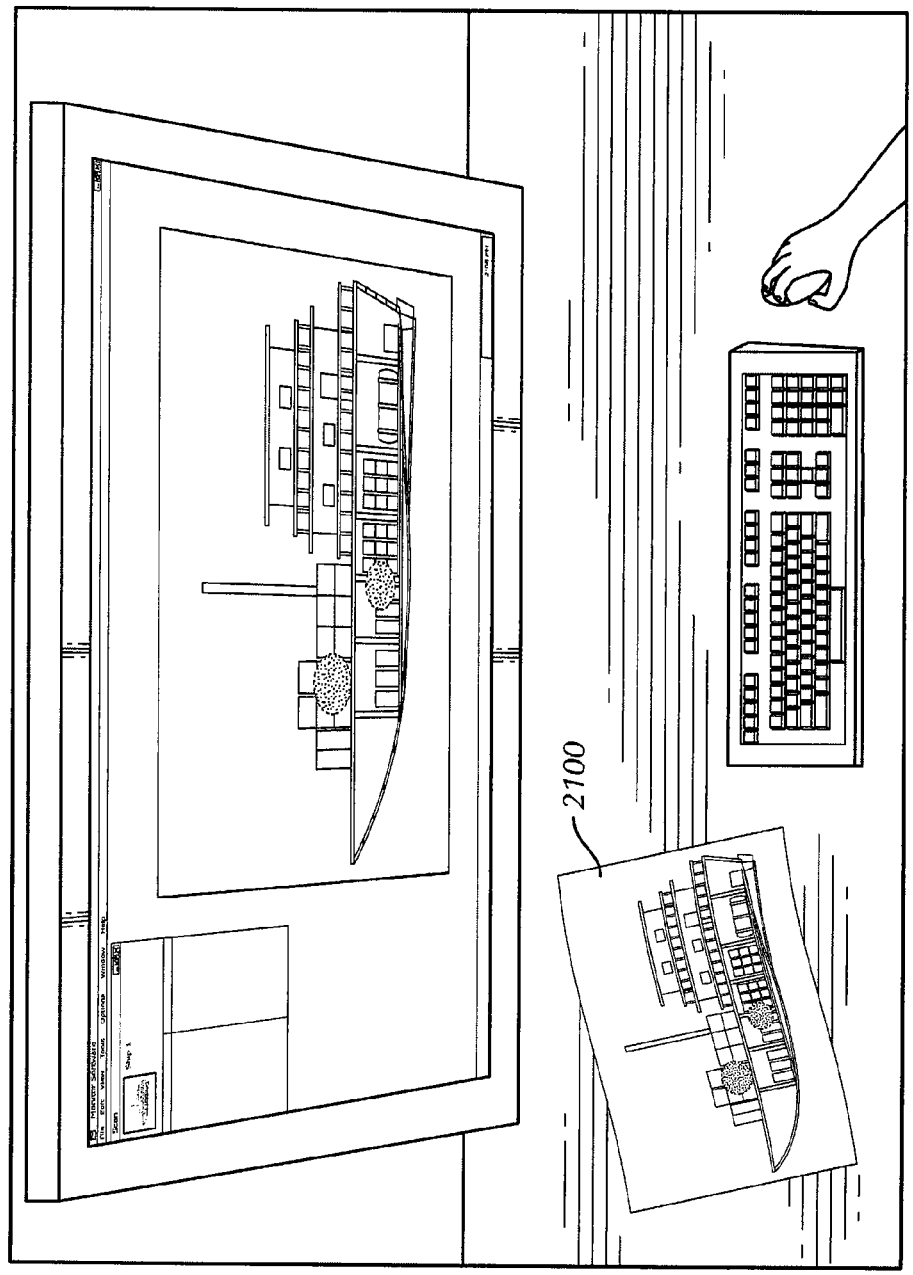
FIG. 21 is a view illustrating printing an inspection image at the operator station of FIG. 18.

In one embodiment, the analyst can print images on a printer as shown in FIG. 21, such as a color printer, producing a printout 2100. The printout 2100 can include any markings added by the operator, such as indications of questionable areas or contents. The printout 2100 can then be used by an inspector performing a manual inspection of the vessel, which can be either the analyst or another inspector to whom the printout is provided. The use of printed images is exemplary and illustrative only, and the images can be transmitted to handheld devices used by the manual inspectors or provided to such inspectors in other ways.

The system S typically includes a purpose-built facility that is generally composed of four main areas: Inspection and Control, Engineering, Crew Waiting, and other civil works.

Figure 19:
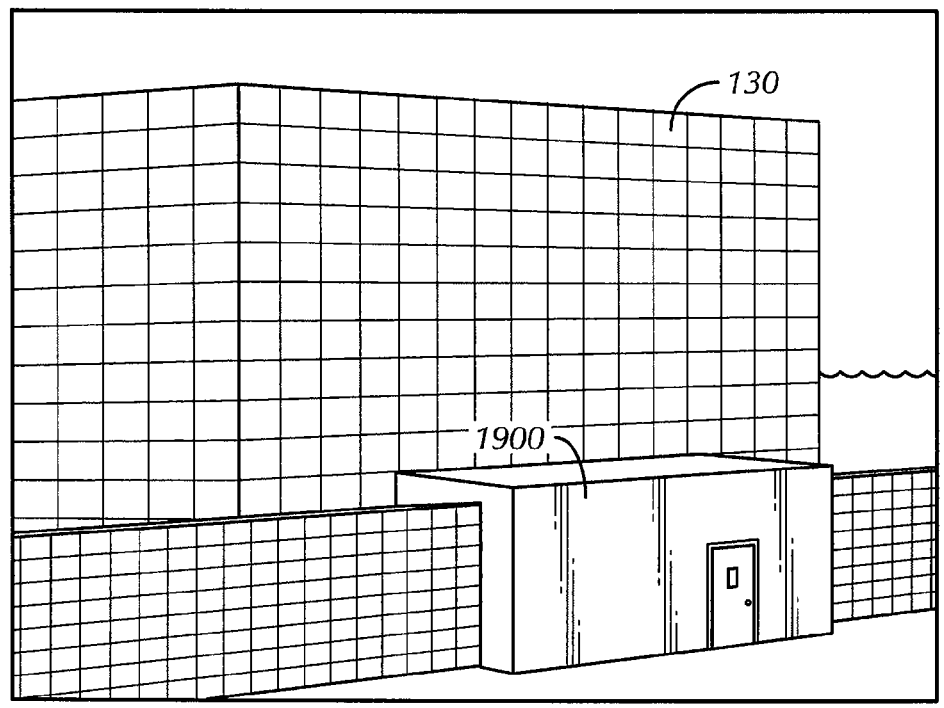
FIG. 19 is a perspective view illustrating one embodiment of an operator building for the system S.

The inspection and control room facility can be a single block building shown in FIG. 19 as building 1900 that is partitioned to house various personnel, such as the head of the customs inspection team, two image analysis workstations, a file server room, a system operations marshal, and a customs commissioner. The size, arrangement, and configuration of the building 1900 shown in FIG. 19 is exemplary and illustrative only, and the building 1900 can have any desired size, arrangement, and configuration. Utilities for the above can also be provided, but are not shown in the drawings for clarity of the drawings. An engineering block typically provides space for the equipment and the engineering staff. This can include a panel room to house the main power distribution panels, equipment control panels, building management systems; a consumables and spares storeroom, a maintenance workshop area, a file and technical document storeroom, an office for the head of maintenance, a maintenance team staff room, and utilities for the above.

As image analysis of a vessel may take several minutes, the crew is typically held in a secure area until the inspectors are satisfied with their findings. It is conceivable that this area may need to accommodate the crews of more than two vessels at any one time. The crew waiting area should be adequately sized and have a controlled entry and exit system in place. All the above facilities can be provided with the required HVAC.

Other civil works can include a walkway for the vessel crews from the disembarkation station to the crew waiting room and from there to the embarkation station. In addition, turnstile barriers and gates at the entry and exit of the disembarkation and re-embarkation stations (not shown in the drawings) can be provided for additional security and access control. Alarms, intercoms, CCTV, interlock system, public address systems etc. can be provided for ensuring safe operation of the system S. Access roads, hard standings, perimeter fencing and external lighting are provided to allow access to the system S. As the system S is contemplated being built in an existing port area, connection of the facility utilities to the port utilities should be provided, preferably within 200 m of the vessel scanning facility boundary fence. Fire fighting facilities are provided according to local safety regulations and ordinances. Maintenance cranes 145 can be provided if desired.

A radiation beam-stop and radiation shielding walls 130 as shown for example in FIGS. 1, 17, and 19 prevent stray radiation from creating hazardous conditions for people and equipment working in the system S. The radiation shielding 130 provides a shielding barrier for reflected and refracted radiation from the collimator 175 and detector array 176.

Data acquisition (analog to digital conversion) from the detector array 176 can occur in an environmentally protected computer room in close proximity to the data collection array.

For installations where the system S is built along an existing pier 180, modifications to the pier 180 may be required to accommodate installation of the detector array 176 assemblies and anchorage for the vessel pull-through winch system.

High-energy 9 MeV X-ray sources are primarily used for their high penetration properties. However, the physical characteristics of X-rays dictate that the radiation intensity varies across an X-ray beam. In one embodiment, the system S can provide penetrate 360 mm of steel in the center of the vessel (above water), 280 mm of steel along the upper edge of the X-ray beam penetrating the upper parts of the vessel, and 220 mm of steel at the submersed in water parts of the vessel.

Similarly, the system S can provide a contrast sensitivity of 0.5% in 100 mm steel and 3% in 300 mm steel, wire detectability of 2 mm behind 100 m of steel and 9 mm behind 300 mm of steel, with a throughput of up to 10 vessels per hour in one embodiment. These values depend on various characteristics of the X-ray emitter 160 and water exclusion section 170 used in the system S, and other system performance characteristics can be configured.

Effects of radiation can be damaging to living creatures and some equipment and hence careful attention must be paid avoid any such damage. The system S should preferably conform to the EU radiation safety requirements, which are among the most stringent in world of radiation safety.

The equipment is designed such that the on site personnel shall not be exposed to radiation levels greater than the EU Standards. This can be achieved by the use of a combination of metallic, concrete and other shielding structures wherever appropriate. However, since 100% shielding of X-rays would be impractical, another measure of protection shall also be provided by the creation of exclusion zones, such as the exclusion zone 1000 shown in FIG. 10.

Materials such as some plastics and electronic equipment can also be susceptible to radiation degradation if exposed for long periods of time. To counter this, careful selection of materials select materials that are suitable for the environments in which they are to operate. Where radiation-hardened materials are not available and the equipment is likely to experience exposure to radiation, local shielding can be provided to protect the sensitive equipment.

Radiation dose to personnel preferably is kept well within an average that is less than 1 μSv (0.1 mR) per hour and less than 1 mSv per year. Dose on cargo is typically kept in the permissible range of 50–100 μSv.

Perimeter guarding such as fences or walls, not shown in the drawings, can provide physical barriers to deter personnel access into the X-ray compound area. The use of CCTVs and monitors can enable all critical parts of the compound to be viewed from the control room 120.

Electrical interlocks and key exchange systems can be provided to ensure that the vessel crew and traffic marshal return to the waiting and control room before the X-ray procedure can be started. During the X-ray process, all personnel access doors to the critical areas can be automatically locked. Activation of any emergency exits can switch the X-ray off.

A short duration prior to the X-ray source being switched on, audible and visible alarms such as alarm 1300 shown in FIG. 13 can be activated to warn of imminent activation of the X-ray beam. In the unlikely event that one person remains in a potentially hazardous area, emergency stops, strategically placed around the facility, can be activated, resulting in switching off the electrical supply to the X-ray and the vessel pull-through system.

Modular design techniques can be employed where possible to ensure easy, fast and safe replacement of the modules. Maintenance on the replaced modules can be carried out in a safe maintenance workshop area.

The vessel screening facility S can be erected alongside an already existing pier 180 or at a new site specially built for the purpose, as desired. Additional cargo handling equipment, not shown in the Figures or otherwise described herein, can be provided for conventional manual inspection of vessels at station 2100, as indicated in FIG. 21.

The foregoing disclosure and description of the invention are illustrative and explanatory thereof, and various changes in the details of the illustrated apparatus and construction and the method of operation may be made without departing from the spirit of the invention.

We claim:

1. A system for scanning a vessel, comprising:
a passage filled with water for transporting the vessel having a first side, a second side, a first end, and a second end;
a scanning system, adapted to scan the entire vessel and its contents; and
a vessel transport subsystem, adapted to move the vessel through the passage at a predetermined distance from the first side of the passage during traversal of the passage by the vessel.

2. The system of claim 1, wherein vessel transport subsystem comprises:
a plurality of rollers, mounted along the first side of the passage,
wherein the rollers position the vessel at the predetermined distance from the first side of the passage during traversal of the passage by the vessel.

3. The system of claim 2, further comprising:
a pier formed as the first side of the passage,
wherein the rollers prevent damage to the vessel from contact with the pier.

4. The system of claim 1, wherein the vessel transport subsystem comprises:
a first winch, connectable to a fore portion of the vessel; and
a second winch, connectable to an aft portion of the vessel.

5. The system of claim 4,
wherein the first winch is positioned proximal to a first end of the passage on the first side of the passage, and
wherein the second winch is positioned proximal to a second end of the passage on the first side of the passage.

6. The system of claim 4, wherein the first winch and the second winch are synchronized with each other.

7. The system of claim 4,
wherein the first winch pulls the vessel through the passage, and
wherein the second winch drags the vessel toward the first side of the passage.

8. The system of claim 1, wherein the vessel transport system ensures the vessel is against the first side of the passage when traversing the passage.

9. A system for scanning a vessel, comprising:
a passage filled with water for transporting the vessel having a first side, a second side, a first end, and a second end;
a scanning system, adapted to scan the entire vessel and its contents; and
a vessel transport subsystem, adapted to move the vessel through the passage, wherein the scanning system comprises:
a radiation emitter, positioned with the second side of the passage; and
a transmission-based radiation detector, positioned with the first side of the passage opposite the radiation emitter,
wherein radiation emitted by the radiation emitter traverses a radiation path between the radiation source and the transmission-based radiation detector across the passage.

10. The system of claim 9, wherein the passage comprises:
a water exclusion section, positioned along the radiation path, the water exclusion section excluding a substantial portion of the water from the radiation path.

11. The system of claim 10, wherein the water exclusion section comprises:
an inflatable balloon, adapted to inflate around the vessel along the radiation path.

12. The system of claim 10, wherein the water exclusion section comprises:
a plurality of exclusion members, each of the plurality of exclusion members extending from a bottom surface of the passage upwards through the water.

13. The system of claim 12, wherein each of the plurality of exclusion members is constructed of a polyethylene resin.

14. The system of claim 12, wherein each of the plurality of exclusion members has a closed cell structure.

15. The system of claim 12, wherein each of the plurality of exclusion members is air-filled.

16. The system of claim 12, wherein each of the plurality of exclusion members is relatively radiation transparent compared to water.

17. The system of claim 12, wherein each of the plurality of exclusion members is flexible.

18. The system of claim 12, wherein each of the plurality of exclusion members is compressible.

19. The system of claim 12, wherein each of the plurality of exclusion members has a circular horizontal cross-sectional shape.

20. The system of claim 12, wherein each of the plurality of exclusion members has a hexagonal cross-sectional shape.

21. The system of claim 12, wherein the plurality of exclusion members form a closely-packed structure.

22. The system of claim 12, wherein each of the plurality of exclusion members is affixed to the bottom surface of the passage.

23. The system of claim 12, wherein each of the plurality of exclusion members extends a predetermined distance above the water.

24. The system of claim 12, wherein each of the plurality of exclusion members has a density of less than one-fifth the density of water.

25. The system of claim 12, wherein the plurality of exclusion members forms a flexible barrier along a path of the vessel through the passage.

26. The system of claim 25, where the vessel displaces some of the plurality of exclusion members when the vessel crosses the radiation path.

27. The system of claim 10, wherein the water exclusion section envelops a submerged portion of the vessel when the vessel crosses the radiation path.

28. The system of claim 10, wherein the water exclusion section displaces a majority of the water along the radiation path when the vessel crosses the radiation path.

29. The system of claim 9, the radiation detector comprising:
a collimator; and
a plurality of detector elements, mounted with the collimator.

30. The system of claim 29, wherein the plurality of detector elements are mounted on a distal side of the collimator from the radiation emitter.

31. The system of claim 29, wherein the collimator extends below the level of the water in the passage.

32. The system of claim 29, wherein approximately half of the collimator extends below the level of the water in the passage.

33. The system of claim 29, wherein the collimator vertically subtends an arc of a predetermined angle formed at the radiation emitter.

34. The system of claim 29, wherein the radiation emitted by the radiation emitter strikes the collimator at a perpendicular angle.

35. The system of claim 29, wherein the collimator comprises:
a plurality of apertures,
wherein each of the plurality of detector elements is positioned over one of the plurality of apertures.

36. The system of claim 29, wherein the collimator comprises:
a plurality of collimator sections connected together.

37. The system of claim 29, wherein the radiation detector further comprises:
a stairwell for access to portions of the collimator below a ground surface level.

38. The system of claim 9, wherein the scanning system further comprises:
a radiation shield, the radiation detector positioned between the radiation emitter and the radiation shield,
wherein the radiation shield stops the radiation emitted from the radiation emitter.

39. The system of claim 38,
wherein the radiation shield forms a convex structure, and
wherein the radiation detector and the radiation shield vertically subtend an arc of a first predetermined angle formed at the radiation emitter, and
wherein the radiation shield horizontally subtends an arc of a second predetermined angle formed at the radiation emitter.

40. The system of claim 9, wherein the radiation emitter comprises:
a linear accelerator.

41. The system of claim 9, wherein the radiation emitter comprises:
a 9 MeV X-ray source.

42. The system of claim 9, wherein the radiation emitter comprises:
a radiation source, configured to emit radiation at a first predetermined beam fan angle,
wherein the radiation emitter emits radiation at a second predetermined beam fan angle, the second predetermined beam fan angle greater than the first predetermined beam fan angle.

43. The system of claim 42, wherein the radiation emitter further comprises:
a magnetic steering unit, adapted to magnetically steer electrons generated by the radiation source,
wherein the radiation source accelerates a beam of electrons at a target to generate the radiation, and
wherein the magnetic steering unit magnetically steers the beam of electrons.

44. The system of claim 43,
wherein the first predetermined beam fan angle is one-third the second predetermined beam fan angle;
wherein the radiation source emits radiation in a first direction corresponding to a first third of the second predetermined beam fan angle at a first time,
wherein the radiation source emits radiation in a second direction corresponding to a second third of the second predetermined beam fan angle at a second time, and
wherein the radiation source emits radiation in a third direction corresponding to a second third of the second predetermined beam fan angle at a third time.

45. The system of claim 44,
wherein the radiation source is a pulsed radiation source,
wherein the magnetic steering unit generates a sinusoidal magnetic field, having a first maximum and a second maximum opposite to the first maxima,
wherein the radiation source accelerates the beam of electrons when the sinusoidal magnetic field reaches the first maxima,
wherein the radiation source accelerates the beam of electrons when the sinusoidal magnetic field reaches the second maxima,
wherein the radiation source accelerates the beam of electrons when the sinusoidal magnetic field is zero,
whereby the radiation source alternately generates radiation in the first direction, the second direction, and the third direction.

46. The system of claim 42, wherein the radiation emitter further comprises:
a lens, adapted to modify the angular divergence of the radiation emitted by the radiation source.

47. The system of claim 46, wherein the lens is an electrostatic lens.

48. The system of claim 46, wherein the lens is an electromagnetic lens.

49. The system of claim 46, wherein the lens is cylindrically symmetric lens.

50. The system of claim 42, where the radiation is emitted with full flux over one-third the second predetermined beam fan angle at any given time.

51. The system of claim 42, where the radiation is emitted with one third of full flux over the second predetermined beam fan angle at any given time.

52. The system of claim 9, wherein the scanning system further comprises:
a filter adapted to stop low-intensity radiation, allowing high-intensity radiation to pass through the filter.

53. The system of claim 52, wherein the filter comprises:
a polymer member.

54. The system of claim 52, wherein the polymer member is embedded in a collimator placed near the radiation emitter.

55. A method of inspecting a vessel, comprising:
moving a vessel through a passage filled with water;
irradiating the entire vessel and its contents along a radiation path at a predetermined location in the passage;
detecting transmitted radiation in the radiation path;
forming an image of the entire vessel and its contents responsive to irradiating the entire vessel and its contents; and
analyzing the image.

56. The method of claim 55, further comprising:
manually inspecting the vessel and its contents responsive to analyzing the image.

57. The method of claim 55, wherein the step of moving a vessel through a passage filled with water comprises:
mooring the vessel fore and aft to a side of the passage;
pulling the vessel through the passage,
wherein the vessel remains a predetermined distance from the side of the passage.

58. The method of claim 57, wherein the step of mooring the vessel comprises:
attaching a first cable connected to a first winch to a fore section of the vessel;
attaching a second cable connected to a second winch to an aft section of the vessel; and
synchronizing the first and second winches.

59. The method of claim 57, wherein the step of pulling the vessel through the passage comprises:
pulling the vessel from a fore mooring;
dragging the vessel from an aft mooring; and
synchronizing the pulling and the dragging,
whereby the vessel remains a predetermined distance from the side of the passage.

60. The method of claim 59, wherein the step of pulling the vessel further comprises:
protecting a side of the vessel from damage from the side of the passage while moving through the passage.

61. The method of claim 60, wherein the step of protecting the side of the vessel comprises:
mounting a plurality of rollers along the side of the passage, the vessel rolling along the side of the passage on the rollers at a predetermined distance from the side of the passage.

62. The method of claim 55, wherein the step of irradiating the entire vessel and its contents comprises:
emitting a beam of radiation from a radiation source along the radiation path, the beam of radiation passing through the vessel and its contents;
detecting the beam of radiation by a radiation detector, producing a plurality of radiation beam data; and
transmitting the radiation beam data for analysis.

63. The method of claim 62, wherein the radiation source is an X-ray emitter.

64. The method of claim 63, wherein the radiation source is a 9 MeV X-ray emitter.

65. The method of claim 62, wherein the radiation source is an gamma-ray emitter.

66. The method of claim 62, wherein the step of emitting a beam of radiation comprises:
emitting a fan-shaped beam of radiation over a first angular range, the angular range covering a vertical slice of the entire vessel along the radiation path.

67. The method of claim 65, wherein the step of emitting a fan-shaped beam of radiation over a first angular range comprises:
emitting a beam of radiation at full flux over a predetermined portion of the angular range at any given time.

68. The method of claim 65, wherein the step of emitting a fan-shaped beam of radiation over a first angular range comprises:
emitting a beam of radiation at a predetermined percentage of full flux over the entire angular range at any given time.

69. The method of claim 62, wherein the radiation source is only capable of generating a radiation beam over a second annular range, the second annular range smaller than the first annular range.

70. The method of claim 69, wherein the step of emitting a beam of radiation from a radiation source comprises:
steering an electron beam onto a target element with a sinusoidal magnetic field;
accelerating the electron beam synchronized to a first maxima of the magnetic field;
accelerating the electron beam synchronized to a second maxima of the magnetic field;
accelerating the electron beam synchronized to a zero level of the magnetic field.

71. The method of claim 69, wherein the radiation source is a pulsed radiation source.

72. The method of claim 69, wherein the step of emitting a beam of radiation from a radiation source comprises:
converting a broad beam with a small angular dispersion to a narrow beam with a large angular divergence, wherein the large angular divergence is of equal angular range to the first angular range.

73. The method of claim 72, wherein the step of emitting a beam of radiation from a radiation source comprises:
refocusing the beam of radiation to expand an angular divergence of the beam of radiation.

74. The method of claim 72, wherein the step of emitting a beam of radiation from a radiation source comprises:
emitting an elliptically shaped electron beam.

75. The method of claim 72, wherein the step of emitting a beam of radiation from a radiation source comprises:
refocusing the beam of radiation with a cylindrically symmetric electromagnetic lens.

76. The method of claim 72, wherein the step of emitting a beam of radiation from a radiation source comprises:
refocusing the beam of radiation with a cylindrically symmetric electrostatic lens.

77. The method of claim 62, wherein the step of irradiating the entire vessel and its contents further comprises:
excluding the water from the radiation path.

78. The method of claim 77, wherein the step of excluding the water from the radiation path comprises:
inflating a balloon along the radiation path, the balloon embracing an underside of the vessel along the radiation path.

79. The method of claim 77, wherein the step of excluding the water from the radiation path comprises:
affixing a plurality of exclusion members along the radiation path;
displacing a majority of the water from the radiation path with the exclusion members; and
displacing some of the plurality of exclusion members upon the vessel traversing the radiation path.

80. The method of claim 79, wherein each of the plurality of exclusion members has a circular horizontal cross-sectional shape.

81. The method of claim 79, wherein each of the plurality of exclusion members has a hexagonal horizontal cross-sectional shape.

82. The method of claim 79, wherein the step of affixing a plurality of exclusion members comprises:
affixing each of the plurality of exclusion members to a bottom surface of the passage;
extending each of the plurality of exclusion members to a predetermined height above a water surface level.

83. The method of claim 79, wherein the step of affixing a plurality of exclusion members comprises:
forming a flexible water baffler of the plurality of exclusion members, along the radiation path.

84. The method of claim 79, wherein the step of excluding the water from the radiation path further comprises:
forming the plurality of exclusion members from a closed-cell polymer.

85. The method of claim 79, wherein the step of excluding the water from the radiation path further comprises:
forming the plurality of exclusion members from a polyethylene resin.

86. The method of claim 79, wherein the step of excluding the water from the radiation path further comprises:
filling the plurality of exclusion members with air.

87. The method of claim 79, wherein the step of excluding the water from the radiation path further comprises:
forming the plurality of exclusion members from a relatively radiation-transparent material.

88. The method of claim 62, wherein the step of detecting the beam of radiation by a radiation detector comprises:

forming a collimator on a side of the passage opposite the radiation source;

collimating the beam of radiation through the collimator onto a plurality of radiation detector elements; and detecting the beam of radiation by the radiation detector elements.

89. The method of claim 88, wherein the step of collimating the beam of radiation comprises:

forming an array of apertures in the collimator; and positioning the plurality of radiation detector elements with the array of apertures.

90. The method of claim 88, wherein the step of collimating the beam of radiation further comprises:

orienting the plurality of radiation detector elements perpendicular to the radiation beam.

91. The method of claim 88, wherein the step of detecting the beam of radiation by a radiation detector further comprises:

shielding operator and crew waiting areas from radiation.

92. The method of claim 55, wherein the step of forming an image comprises:

repeatedly forming a slice image of a slice of the vessel along the radiation path as the vessel crosses the radiation path, producing a plurality of slice images; and combining the plurality of slice images into an image of the entire vessel and its contents.

93. The method of claim 55, wherein the step of forming an image comprises:

forming an first image of a first portion of a slice of the vessel, forming an second image of a second portion of a slice of the vessel; and combining the first image and the second image into a slice image of a slice of the vessel along the radiation path as the vessel crosses the radiation path.

94. The method of claim 55, wherein the step of analyzing the image comprises:

displaying the image on a workstation for a first inspector; and manipulating the image as directed by the first inspector.

95. The method of claim 55, wherein the step of analyzing the image further comprises:

marking a suspect area of the image for manual inspection, producing a marked image.

96. The method of claim 95, wherein the step of analyzing the image further comprises:

passing the marked image to a second inspector; and manually inspecting the suspect area of the vessel.

97. The method of claim 96, wherein the step of passing the marked image comprises:

printing the marked image for use by the second inspector.

98. The method of claim 55, further comprising:

detecting an oversized vessel; and signaling the oversized vessel to bypass the passage;

manually inspecting the oversized vessel and its contents.

99. The method of claim 55, further comprising:

isolating a crew of the vessel during inspection in a secure area.

100. The method of claim 55, further comprising:

maintaining a predetermined water level in the passage, regardless of tide conditions.

101. The method of claim 55, further comprising:

maintaining a predetermined water level in the passage, regardless of tide conditions.

102. The method of claim 55, further comprising:

signaling the vessel to enter the passage for inspection.

103. The method of claim 55, further comprising:

disembarking a crew of the vessel prior to inspection of the vessel; and embarking the crew after inspection of the vessel.

104. The method of claim 55, further comprising:

signaling the vessel to move to a holding area for manual inspection.

105. The method of claim 55, further comprising:

signaling the vessel to exit the passage after inspection.

106. An apparatus, comprising:

a water-filled passage; and a water exclusion section, positioned in the water-filled passage along a radiation path traversed by radiation from a radiation source, excluding a substantial portion of the water from the radiation path.

107. The apparatus of claim 106, wherein the water exclusion section comprise:

an inflatable balloon, adapted to inflate around a vessel traversing the water exclusion section along the radiation path.

108. The apparatus of claim 106, the water exclusion section comprising:

a plurality of exclusion members, each of the plurality of exclusion members extending from a bottom surface of a water-filled passage upwards through the water.

109. The apparatus of claim 108, wherein each of the plurality of exclusion members is constructed of a polyethylene resin.

110. The apparatus of claim 108, wherein each of the plurality of exclusion members has a closed cell structure.

111. The apparatus of claim 108, wherein each of the plurality of exclusion members is air-filled.

112. The apparatus of claim 108, wherein each of the plurality of exclusion members is relatively radiation transparent compared to water.

113. The apparatus of claim 108, wherein each of the plurality of exclusion members is flexible.

114. The apparatus of claim 108, wherein each of the plurality of exclusion members is compressible.

115. The apparatus of claim 108, wherein each of the plurality of exclusion members has a circular horizontal cross-sectional shape.

116. The apparatus of claim 108, wherein each of the plurality of exclusion members has a hexagonal cross-sectional shape.

117. The apparatus of claim 108, wherein the plurality of exclusion members form a closely-packed structure.

118. The apparatus of claim 108, wherein each of the plurality of exclusion members is affixed to the bottom surface of the passage.

119. The apparatus of claim 108, wherein each of the plurality of exclusion members extends a predetermined distance above the water.

120. The apparatus of claim 108, wherein each of the plurality of exclusion members has a density of less than one-fifth the density of water.

121. The apparatus of claim 108, wherein each of the plurality of exclusion members forming a flexible barrier along a path of the vessel through the passage.

122. The apparatus of claim 121, where the vessel displaces some of the plurality of exclusion members when the vessel crosses the radiation path.

123. The apparatus of claim 106, wherein the water exclusion section envelops a submerged portion of a vessel when the vessel crosses the radiation path.

124. The apparatus of claim 106, wherein the water exclusion section displaces a majority of the water along the radiation path when a vessel crosses the radiation path.

125. A method comprising:
irradiating a vessel and its contents as the vessel crosses a radiation path; and
excluding water from the radiation path.

126. The method of claim 125, wherein the step of excluding water from the radiation path comprises:
inflating a balloon along the radiation path, the balloon embracing an underside of the vessel along the radiation path.

127. The method of claim 125, wherein the step of excluding water from the radiation path comprises:
affixing a plurality of exclusion members along the radiation path;
displacing a majority of the water from the radiation path with the exclusion members; and
displacing some of the plurality of exclusion members upon the vessel traversing the radiation path.

128. The method of claim 127, wherein each of the plurality of exclusion members has a circular horizontal cross-sectional shape.

129. The method of claim 127, wherein each of the plurality of exclusion members has a hexagonal horizontal cross-sectional shape.

130. The method of claim 127, wherein the step of affixing a plurality of exclusion members comprises:
affixing each of the plurality of exclusion members to a bottom surface of the passage;
extending each of the plurality of exclusion members to a predetermined height above a water surface level.

131. The method of claim 127, wherein the step of affixing a plurality of exclusion members comprises:
forming a flexible water barrier of the plurality of exclusion members, along the radiation path.

132. The method of claim 127, wherein the step of excluding water from the radiation path further comprises:
forming the plurality of exclusion members from a closed-cell polymer.

133. The method of claim 127, wherein the step of excluding water from the radiation path further comprises:
forming the plurality of exclusion members from a polyethylene resin.

134. The method of claim 127, wherein the step of excluding water from the radiation path further comprises:
filling the plurality of exclusion members with air.

135. The method of claim 127, wherein the step of excluding water from the radiation path further comprises:
forming the plurality of exclusion members from a relatively radiation-transparent material.

136. A system for scanning a vessel, comprising:
a passage filled with water for transporting the vessel having a first side, a second side, a first end, and a second end, comprising:
a water exclusion section, positioned along a radiation path, the water exclusion section excluding a substantial portion of the water from the radiation path, forming a flexible barrier along a path of the vessel through the passage, wherein the water exclusion section comprises:
a plurality of flexible exclusion members forming a closely-packed structure, constructed of a polyethylene resin with a closed cell structure and filled with air, each of the plurality of exclusion members affixed to a bottom surface of the passage and extending from the bottom surface of the passage upwards through the water to a predetermined
distance above the water, each of the plurality of exclusion members
having a hexagonal cross-sectional shape;
a vessel transport subsystem, adapted to move the vessel through the passage and ensure the vessel is against the first side of the passage when traversing the passage, wherein the vessel transport subsystem comprises:
a first winch, positioned proximal to a first end of the passage on the first side of the passage and connectable to a fore portion of the vessel, adapted to pull the vessel through the passage;
a second winch, positioned proximal to a second end of the passage on the first side of the passage and connectable to an aft portion of the vessel and synchronized with the first winch, adapted to drag the vessel toward the first side of the passage; and
a plurality of rollers, mounted along the first side of the passage, adapted to position the vessel at a predetermined distance from the first side of the passage during traversal of the passage by the vessel and prevent damage to the vessel from contact with the pier;
a pier formed as the first side of the passage; and
a scanning system, adapted to scan the entire vessel and its contents, wherein the scanning system comprising:
a radiation emitter, positioned with the second side of the passage, comprising a 9 MeV X-ray source;
a first collimator, positioned with the radiation emitter;
a polymer filter adapted to stop low-intensity radiation, allowing high-intensity radiation to pass through the filter, the polymer filter embedded in the first collimator,
a second collimator, positioned between the first collimator and the passage proximal to the passage;
a radiation detector, positioned with the first side of the passage opposite the radiation emitter, comprising:
a third collimator, extending below the level of the water in the passage having a plurality of apertures; and
a plurality of detector elements, mounted on a distal side of the collimator from the radiation emitter, each of the plurality of detector elements positioned over one of the plurality of apertures; and
a radiation shield, the radiation detector positioned between the radiation emitter and the radiation shield,
wherein the vessel displaces some of the plurality of exclusion members when the vessel crosses the radiation path,
wherein each of the plurality of exclusion members is relatively radiation transparent compared to water, and
wherein radiation emitted by the radiation emitter traverses a radiation path between the radiation source and the radiation detector across the passage.

* * * * *